US012664372B2

(12) United States Patent　　　　　(10) Patent No.:　US 12,664,372 B2
Lee et al.　　　　　　　　　　　　　　(45) Date of Patent:　Jun. 23, 2026

(54) SEMANTICS-GUIDED DOMAIN-SPECIFIC DATA AUGMENTATION FOR TEXT-TO-GRAPH PARSING

(71) Applicant: International Business Machines Corporation, Armonk, NY (US)

(72) Inventors: Young-Suk Lee, Mahopac, NY (US); Sadhana Kumaravel, White Plains, NY (US); Ramon Fernandez Astudillo, White Plains, NY (US); Tahira Naseem, Briarcliff Manor, NY (US); Radu Florian, Danbury, CT (US); Salim Roukos, Redondo Beach, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 378 days.

(21) Appl. No.: 18/344,464

(22) Filed: Jun. 29, 2023

(65) Prior Publication Data

US 2025/0005287 A1　　Jan. 2, 2025

(51) Int. Cl.
*G06F 40/30*　　　(2020.01)
*G06F 40/205*　　(2020.01)
*G06N 20/00*　　(2019.01)

(52) U.S. Cl.
CPC ............ *G06F 40/30* (2020.01); *G06F 40/205* (2020.01); *G06N 20/00* (2019.01)

(58) Field of Classification Search
None
See application file for complete search history.

(56) References Cited

U.S. PATENT DOCUMENTS

2022/0171923 A1　　6/2022　Wu et al.
2022/0253611 A1*　8/2022　Galitsky ............. G06F 16/3329
2023/0060589 A1　　3/2023　Ravishankar et al.

FOREIGN PATENT DOCUMENTS

WO　　　2022091536 A1　　5/2022

OTHER PUBLICATIONS

Lee, Y.-S. et al. | "Maximum Bayes Smatch Ensemble Distillation for AMR Parsing." In Proceedings of the 2022 Conference of the North American Chapter of the Association for Computational Linguistics: Human Language Technologies, Jul. 10-15, 2022, pp. 5379-5392, Seattle, United States. Association for Computational Linguistics, 14 pages.

(Continued)

*Primary Examiner* — Antim G Shah
(74) *Attorney, Agent, or Firm* — Amin, Turocy & Watson, LLP

(57)　　　　　　ABSTRACT

Systems and techniques that facilitate semantics-guided domain-specific data augmentation for text-to-graph parsing are provided. In various embodiments, a system can access an annotated training dataset, wherein the annotated training dataset can comprise a set of abstract meaning representation graphs respectively corresponding to a set of natural language sentences. In various aspects, the system can generate an augmented version of the annotated training dataset, based on applying semantics-guided composition operations or semantics-guided substitution operations to the set of abstract meaning representation graphs. In various instances, a lexicon legend can comprise domain-specific graphs respectively representing discrete tokens unique to a domain of the annotated training dataset. In some cases, various of the domain-specific graphs can be composed or substituted onto or into various of the set of abstract meaning representation graphs, in response to semantic determinations, such as semantic-type-based determinations, argu- (Continued)

ment-structure-based determinations, or incoming-semantic-relation-based determinations.

20 Claims, 20 Drawing Sheets

(56)                    References Cited

OTHER PUBLICATIONS

Yang, J. et al. | "SUBS: Subtree Substitution for Compositional Semantic Parsing." Proceedings of the 2022 Conference of the North American Chapter of the Association for Computational Linguistics, Human Language Technologies, pp. 169-174, Jul. 10-15, 2022, 6 pages.

Shi, H. et al. | "Substructure Substitution: Structured Data Augmentation for NLP." Findings of the Association for Computational Linguistics: ACL-IJCNLP 2021, pp. 3494-3508, Aug. 1-6, 2021, 15 pages.

Andreas, J. | "Good-Enough Compositional Data Augmentation." Proceedings of the 58th Annual Meeting of the Association for Computational Linguistics, pp. 7556-7566, Jul. 5-10, 2020, 11 pages.

Jia, R. et al. | "Data Recombination for Neural Semantic Parsing." Proceedings of the 54th Annual Meeting of the Association for Computational Linguistics, pp. 12-22, Berlin, Germany, Aug. 7-12, 2016, 11 pages.

Bonial, C. et al. | "Abstract Meaning Representation of Constructions: The More We Include, the Better the Representation." In Proceedings of the Eleventh International Conference on Language Resources and Evaluation (LREC 2018), Miyazaki, Japan. European Language Resources Association (ELRA), 8 pages.

Van Der Plas, L. et al. | "Domain Adaptation with Artificial Data for Semantic Parsing of Speech." Proceedings of NAACL HLT 2009: Short Papers, pp. 125-128, Boulder, Colorado, Jun. 2009, 4 pages.

Xu, S. et al. | "AutoQA: From Databases To QA Semantic Parsers With Only Synthetic Training Data." Proceedings of the 2020 Conference on Empirical Methods in Natural Language Processing, pp. 422-434, Nov. 16-20, 2020, 13 pages.

Yin, P. et al. | "Compositional Generalization for Neural Semantic Parsing via Span-level Supervised Attention." Proceedings of the 2021 Conference of the North American Chapter of the Association for Computational Linguistics: Human Language Technologies, pp. 2810-2823, Jun. 6-11, 2021, 14 pages.

Chen, X. et al. | "Low-Resource Domain Adaptation for Compositional Task-Oriented Semantic Parsing." Proceedings of the 2020 Conference on Empirical Methods in Natural Language Processing, pp. 5090-5100, Nov. 16-20, 2020, 11 pages.

* cited by examiner

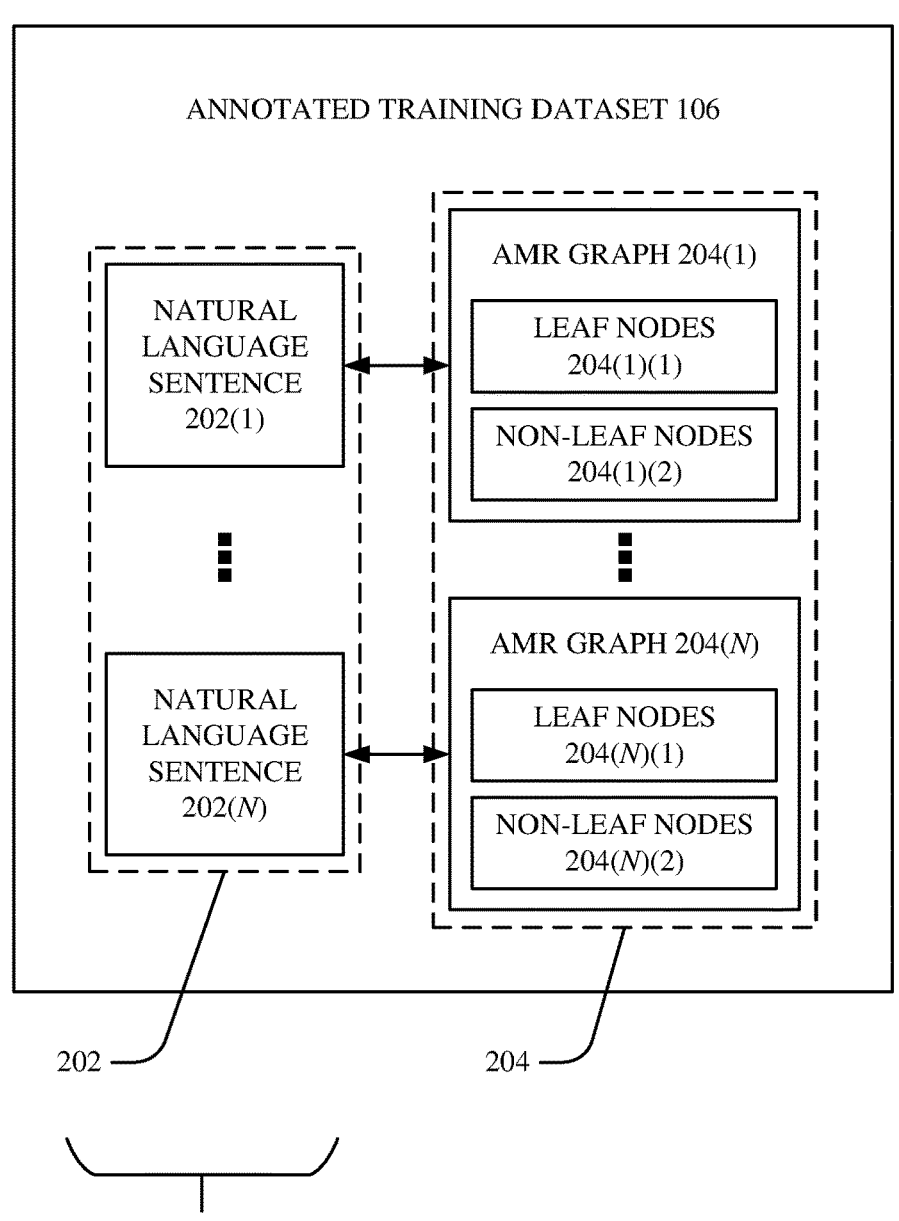
CAN CONTAIN VOCABULARY
OR PHRASEOLOGY THAT IS
SPECIFIC TO THE DOMAIN 108
FIG. 2

300

ABSTRACT MEANING REPRESENTATION PARSER 104

ANNOTATED TRAINING DATASET 106

DOMAIN 108

AUGMENTATION SYSTEM 102

AUGMENTATION COMPONENT 118

ACCESS COMPONENT 114

MEMORY 112

TRAINING COMPONENT 120

DOMAIN COMPONENT 116

DOMAIN LEXICON LEGEND 302

PROCESSOR 110

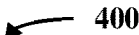
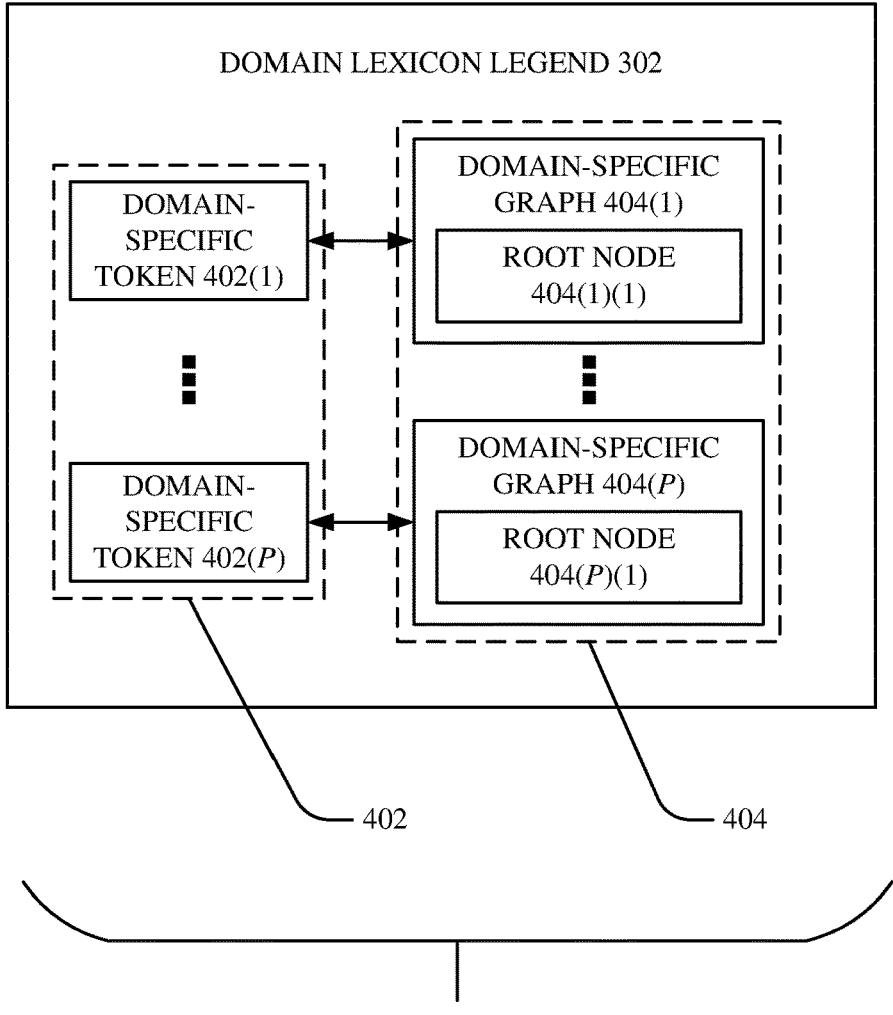
IN SOME CASES, 402 AND 404 CAN BE DERIVED FROM RESOURCES SPECIFIC TO THE DOMAIN 108; FOR INSTANCE, EACH OF 402 CAN BE A LEXICAL ITEM (E.G., ENTITY NAME, ABBREVIATION, SUPERLATIVE, COMPARATIVE) THAT IS KNOWN TO BE USED IN THE DOMAIN 108, AND A RESPECTIVE ONE OF 404 CAN BE A GRAPH THAT REPRESENTS THAT LEXICAL ITEM;
IN OTHER CASES, 402 AND 404 CAN BE EXTRACTED FROM THE TRAINING DATASET 106
FIG. 4

800
802
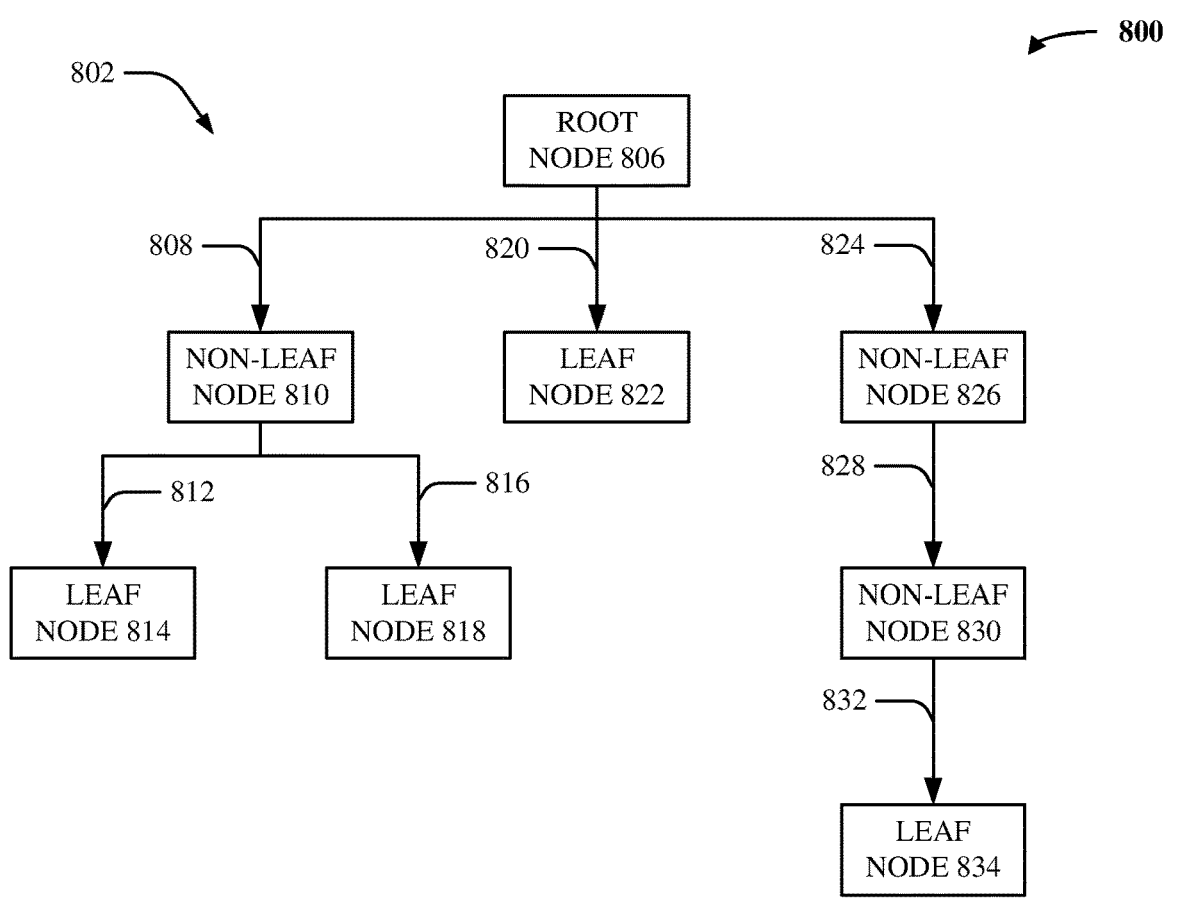
804
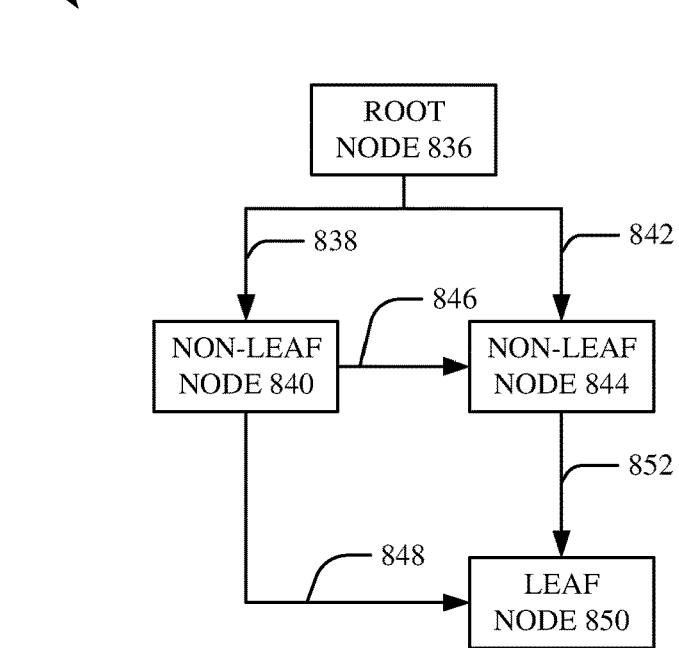
FIG. 8

IF ROOT NODE 836 IS OF SAME
SEMANTIC TYPE AS LEAF NODE
822, CAN GENERATE NEW AMR
GRAPH 902 BY COMPOSING
DOMAIN-SPECIFIC GRAPH 804
ONTO LEAF NODE 822

IF ROOT NODE 836 IS OF SAME
SEMANTIC TYPE AS NON-LEAF
NODE 826, CAN GENERATE NEW
AMR GRAPH 1002 BY
SUBSTITUTING NON-LEAF NODE
826 AND ITS DESCENDANTS
(E.G., 830, 834) WITH DOMAIN-
SPECIFIC GRAPH 804

1100

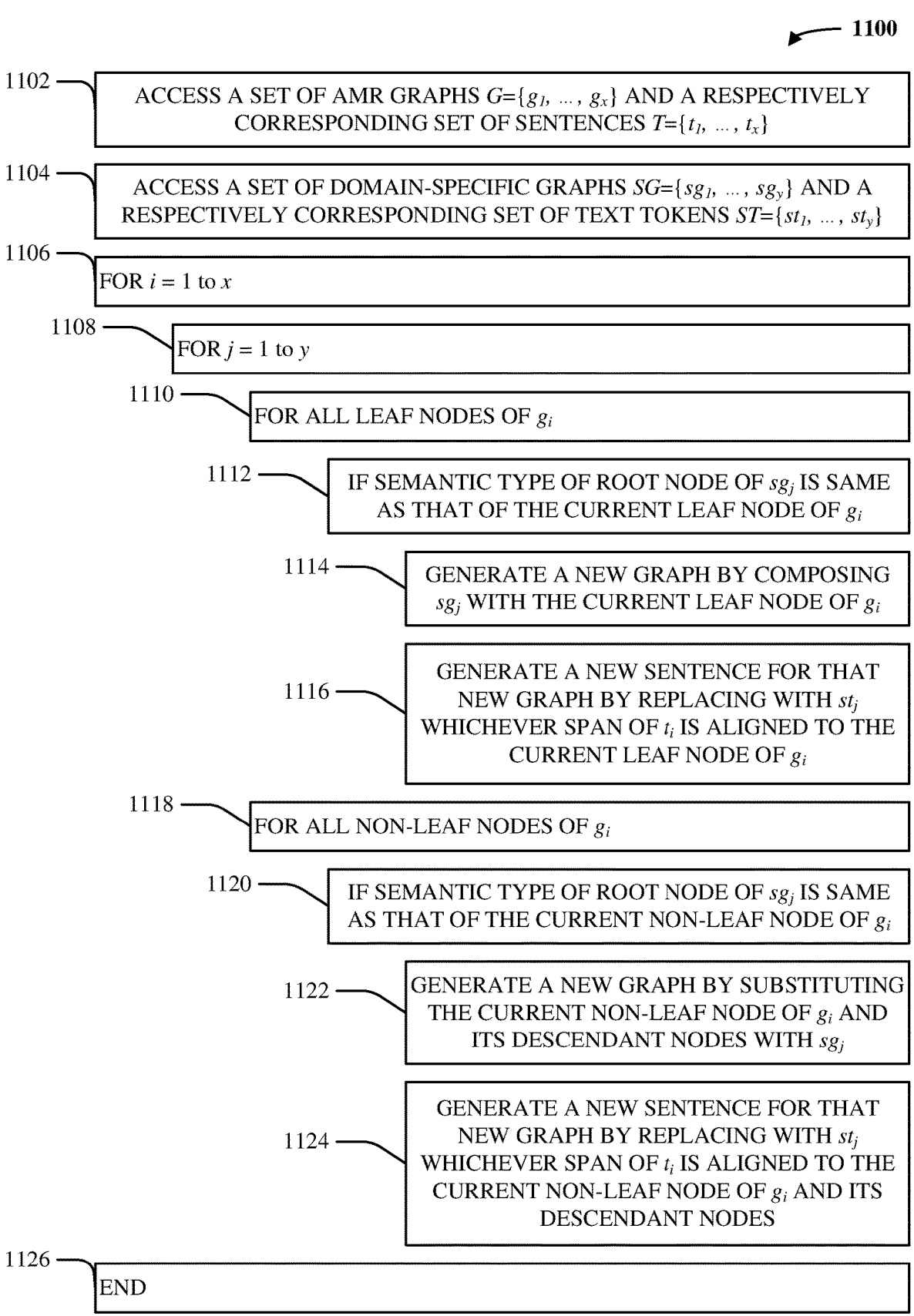

1102 — ACCESS A SET OF AMR GRAPHS $G=\{g_1, ..., g_x\}$ AND A RESPECTIVELY CORRESPONDING SET OF SENTENCES $T=\{t_1, ..., t_x\}$

1104 — ACCESS A SET OF DOMAIN-SPECIFIC GRAPHS $SG=\{sg_1, ..., sg_y\}$ AND A RESPECTIVELY CORRESPONDING SET OF TEXT TOKENS $ST=\{st_1, ..., st_y\}$

1106 — FOR $i = 1$ to $x$

1108 — FOR $j = 1$ to $y$

1110 — FOR ALL LEAF NODES OF $g_i$

1112 — IF SEMANTIC TYPE OF ROOT NODE OF $sg_j$ IS SAME AS THAT OF THE CURRENT LEAF NODE OF $g_i$

1114 — GENERATE A NEW GRAPH BY COMPOSING $sg_j$ WITH THE CURRENT LEAF NODE OF $g_i$

1116 — GENERATE A NEW SENTENCE FOR THAT NEW GRAPH BY REPLACING WITH $st_j$ WHICHEVER SPAN OF $t_i$ IS ALIGNED TO THE CURRENT LEAF NODE OF $g_i$

1118 — FOR ALL NON-LEAF NODES OF $g_i$

1120 — IF SEMANTIC TYPE OF ROOT NODE OF $sg_j$ IS SAME AS THAT OF THE CURRENT NON-LEAF NODE OF $g_i$

1122 — GENERATE A NEW GRAPH BY SUBSTITUTING THE CURRENT NON-LEAF NODE OF $g_i$ AND ITS DESCENDANT NODES WITH $sg_j$

1124 — GENERATE A NEW SENTENCE FOR THAT NEW GRAPH BY REPLACING WITH $st_j$ WHICHEVER SPAN OF $t_i$ IS ALIGNED TO THE CURRENT NON-LEAF NODE OF $g_i$ AND ITS DESCENDANT NODES

1126 — END

FIG. 11

IF RELATIONS 838 AND 842 MATCH RELATIONS 812 AND 816, THEN ROOT NODE 826 CAN BE CONSIDERED AS HAVING A SAME ARGUMENT STRUCTURE AS NON-LEAF NODE 810 (NOTWITHSTANDING THAT ROOT NODE 836 AND NON-LEAF NODE 810 MAY BE OF DIFFERENT SEMANTIC TYPES);

SO, CAN GENERATE NEW AMR GRAPH 1302 BY SUBSTITUTING NON-LEAF NODE 810 AND ITS DESCENDANTS (E.G., 814, 818) WITH DOMAIN-SPECIFIC GRAPH 804

1400

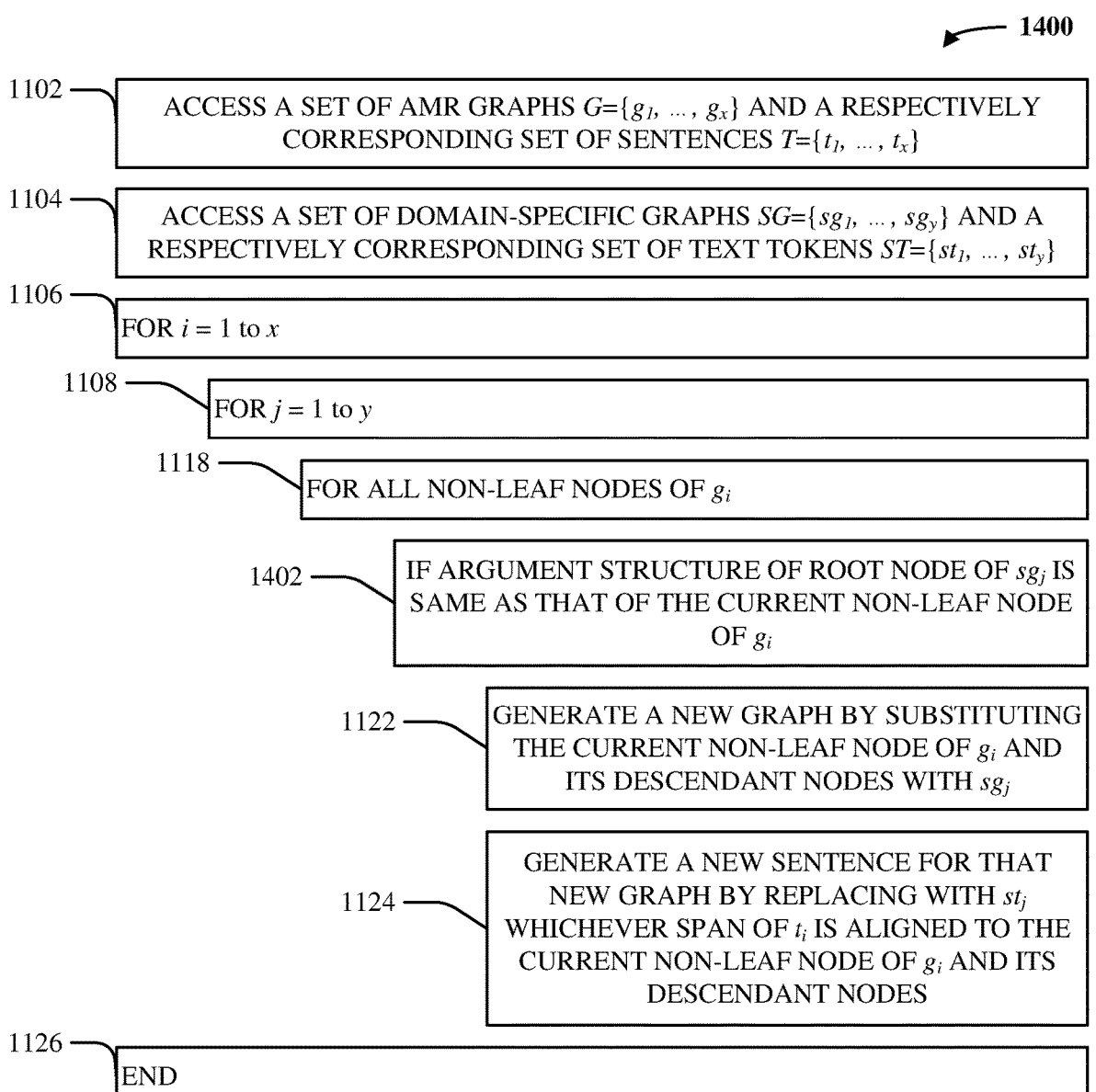

1102 — ACCESS A SET OF AMR GRAPHS $G=\{g_1, \dots, g_x\}$ AND A RESPECTIVELY CORRESPONDING SET OF SENTENCES $T=\{t_1, \dots, t_x\}$ 1104 — ACCESS A SET OF DOMAIN-SPECIFIC GRAPHS $SG=\{sg_1, \dots, sg_y\}$ AND A RESPECTIVELY CORRESPONDING SET OF TEXT TOKENS $ST=\{st_1, \dots, st_y\}$ 1106 — FOR $i = 1$ to $x$ 1108 — FOR $j = 1$ to $y$ 1118 — FOR ALL NON-LEAF NODES OF $g_i$ 1402 — IF ARGUMENT STRUCTURE OF ROOT NODE OF $sg_j$ IS SAME AS THAT OF THE CURRENT NON-LEAF NODE OF $g_i$ 1122 — GENERATE A NEW GRAPH BY SUBSTITUTING THE CURRENT NON-LEAF NODE OF $g_i$ AND ITS DESCENDANT NODES WITH $sg_j$ 1124 — GENERATE A NEW SENTENCE FOR THAT NEW GRAPH BY REPLACING WITH $st_j$ WHICHEVER SPAN OF $t_i$ IS ALIGNED TO THE CURRENT NON-LEAF NODE OF $g_i$ AND ITS DESCENDANT NODES

1126 — END

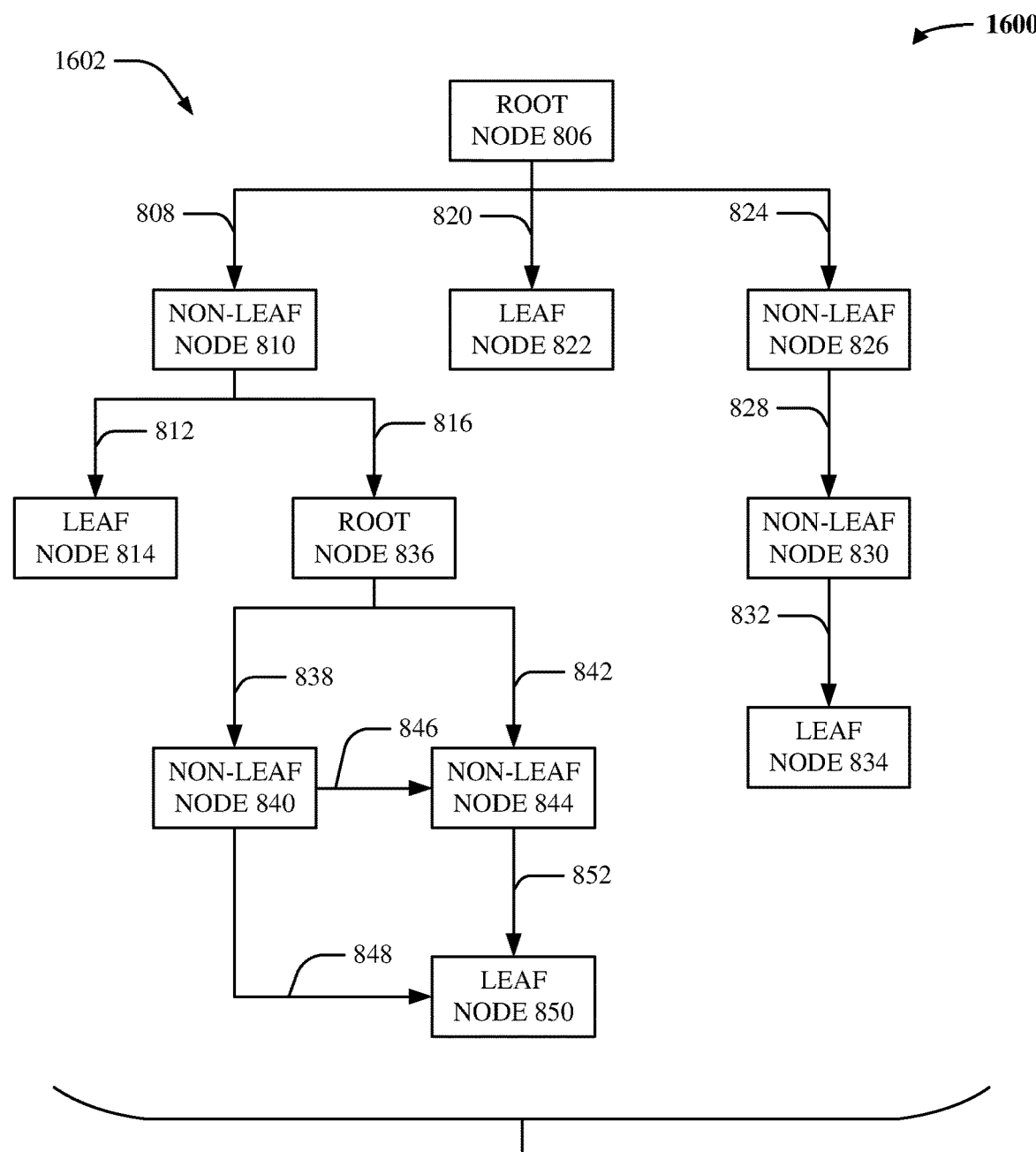

WITH RESPECT TO RELATION 816, NON-LEAF NODE 810 CAN BE CONSIDERED AS A PARENT NODE, AND LEAF NODE 818 CAN BE CONSIDERED AS A CHILD NODE;

IF IT IS KNOWN THAT WHATEVER RELATION THAT WAS ASSOCIATED WITH ROOT NODE 836 WAS SAME AS RELATION 816, CAN GENERATE NEW AMR GRAPH 1602 BY COMPOSING ROOT NODE 836 ONTO LEAF NODE 818 (NOTWITHSTANDING THAT ROOT NODE 836 AND LEAF NODE 818 MIGHT HAVE DIFFERENT SEMANTIC TYPES OR ARGUMENT STRUCTURES)

FIG. 16

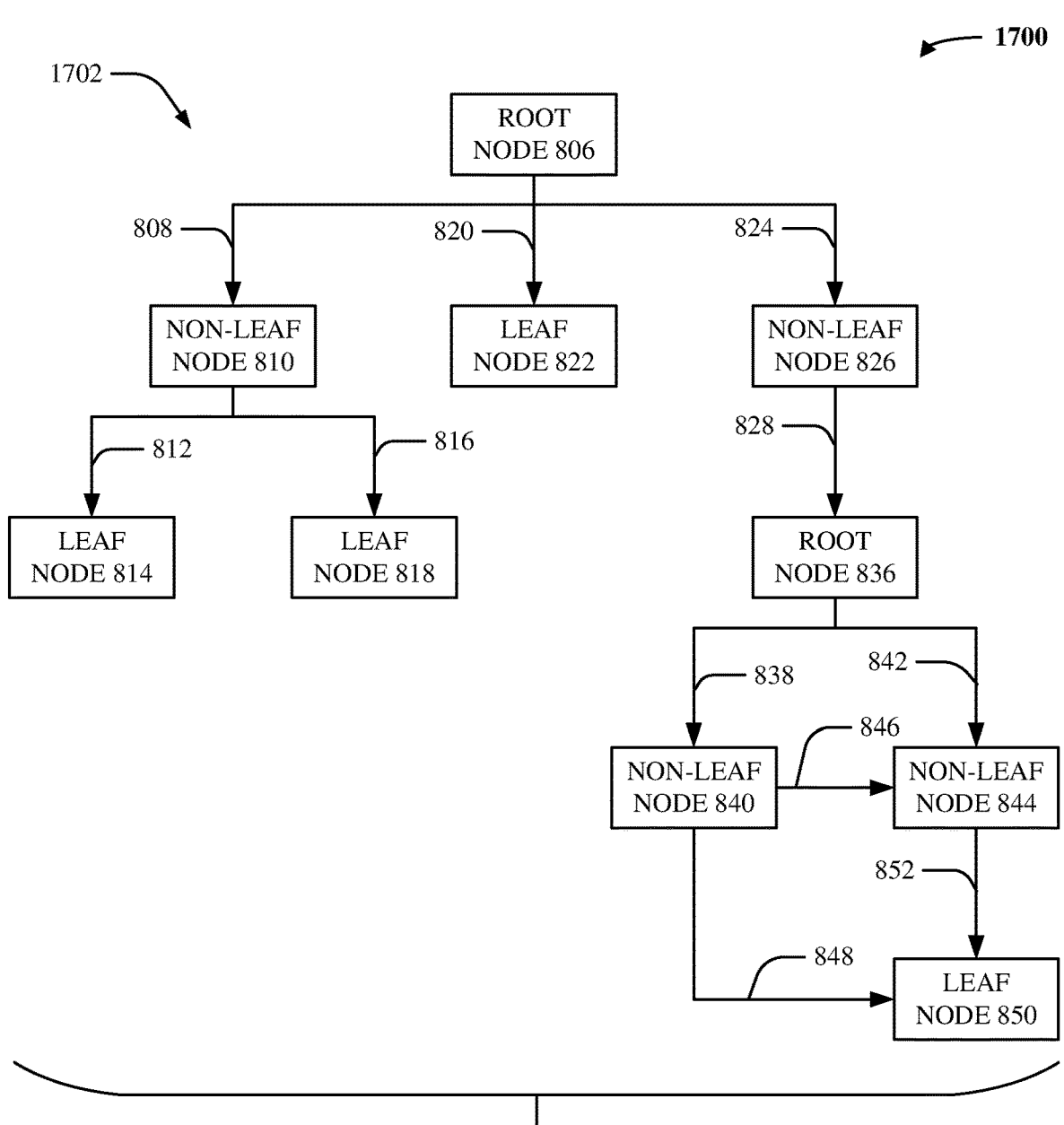

WITH RESPECT TO RELATION 828, NON-LEAF NODE 826 CAN BE CONSIDERED AS A PARENT NODE, AND NON-LEAF NODE 830 CAN BE CONSIDERED AS A CHILD NODE;

IF IT IS KNOWN THAT WHATEVER RELATION THAT WAS ASSOCIATED WITH ROOT NODE 836 WAS SAME AS RELATION 828, CAN GENERATE NEW AMR GRAPH 1702 BY SUBSTITUTING NON-LEAF NODE 830 AND ITS DESCENDANTS (E.G., 834) WITH DOMAIN-SPECIFIC GRAPH 804 (NOTWITHSTANDING THAT ROOT NODE 836 AND NON-LEAF NODE 830 MIGHT HAVE DIFFERENT SEMANTIC TYPES OR ARGUMENT STRUCTURES)

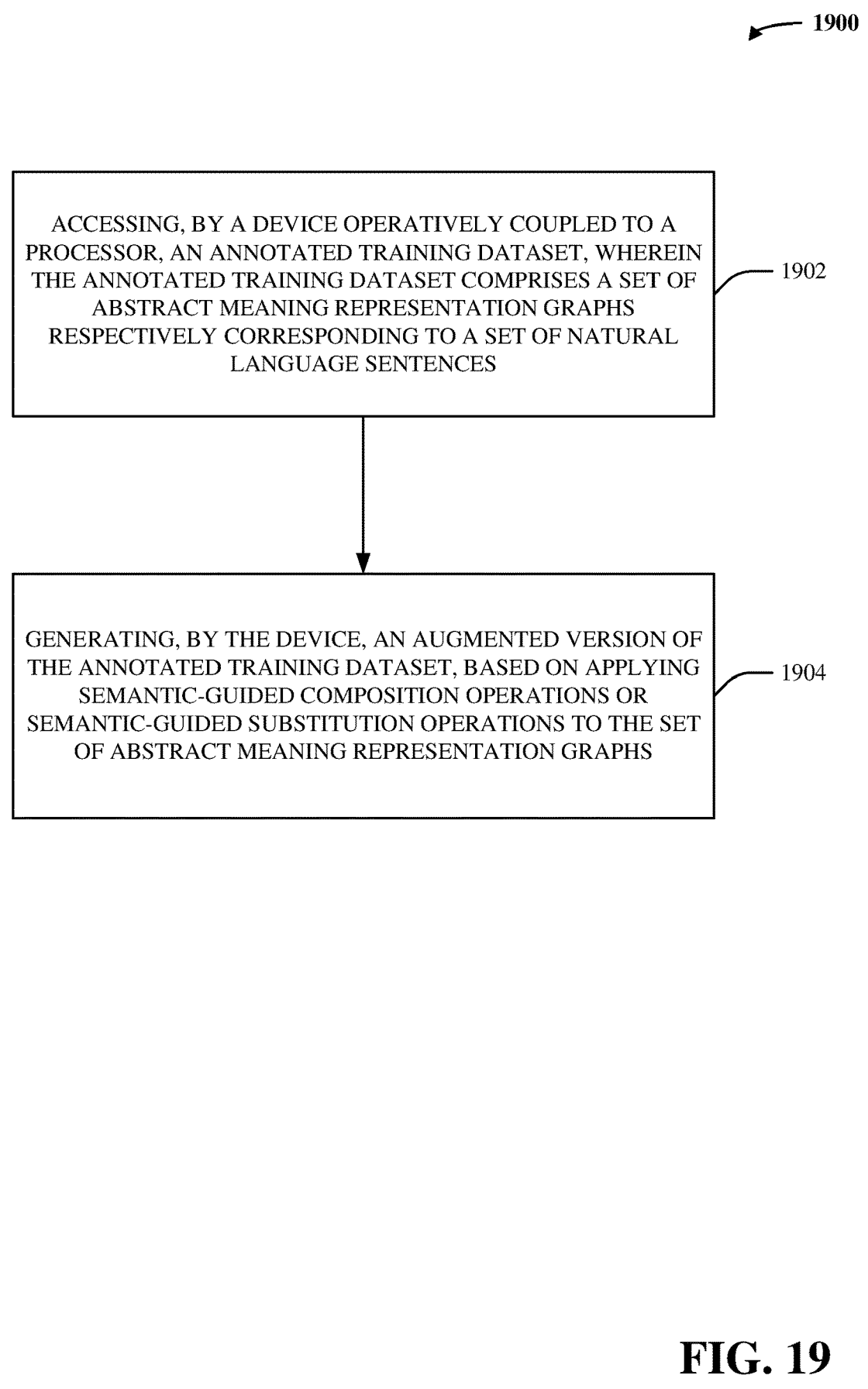

```
ACCESSING, BY A DEVICE OPERATIVELY COUPLED TO A
PROCESSOR, AN ANNOTATED TRAINING DATASET, WHEREIN
THE ANNOTATED TRAINING DATASET COMPRISES A SET OF       1902
ABSTRACT MEANING REPRESENTATION GRAPHS
RESPECTIVELY CORRESPONDING TO A SET OF NATURAL
LANGUAGE SENTENCES
```

```
GENERATING, BY THE DEVICE, AN AUGMENTED VERSION OF
THE ANNOTATED TRAINING DATASET, BASED ON APPLYING
SEMANTIC-GUIDED COMPOSITION OPERATIONS OR                1904
SEMANTIC-GUIDED SUBSTITUTION OPERATIONS TO THE SET
OF ABSTRACT MEANING REPRESENTATION GRAPHS
```

FIG. 19

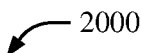
2000

COMPUTER   2001

PROCESSOR SET   2010

PROCESSING CIRCUITRY   2020          CACHE   2021

COMMUNICATION FABRIC   2011

VOLATILE MEMORY   2012

PERSISTENT STORAGE 2013

OPERATING SYSTEM   2022

SEMANTIC-GUIDED AND DOMAIN-SPECIFIC TRAINING DATA AUGMENTATION CODE

2080

PERIPHERAL DEVICE SET   2014

UI DEVICE SET   2023          STORAGE   2024          IoT SENSOR SET   2025

NETWORK MODULE   2015

WAN   2002

END USER DEVICE   2003

REMOTE SERVER   2004

REMOTE DATABASE   2030

PRIVATE CLOUD   2006

GATEWAY   2040

PUBLIC CLOUD   2005

CLOUD ORCHESTRATION MODULE   2041          HOST PHYSICAL MACHINE SET   2042

VIRTUAL MACHINE SET   2043          CONTAINER SET   2044

FIG. 20

SEMANTICS-GUIDED DOMAIN-SPECIFIC DATA AUGMENTATION FOR TEXT-TO-GRAPH PARSING

BACKGROUND

The subject disclosure relates to deep learning, and more specifically to semantics-guided domain-specific data augmentation for text-to-graph parsing.

SUMMARY

The following presents a summary to provide a basic understanding of one or more embodiments. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, methods, or apparatuses that can facilitate semantics-guided domain-specific data augmentation for text-to-graph parsing are described.

According to one or more embodiments, a system is provided. In various aspects, the system can comprise a processor that can execute computer-executable components stored in a non-transitory computer-readable memory. In various instances, the computer-executable components can comprise an access component that can access an annotated training dataset, wherein the annotated training dataset can comprise a set of abstract meaning representation graphs respectively corresponding to a set of natural language sentences. In various cases, the computer-executable components can comprise an augmentation component that can generate an augmented version of the annotated training dataset, based on applying semantics-guided composition operations or semantics-guided substitution operations to the set of abstract meaning representation graphs.

According to various embodiments, the above-described system can be implemented as a computer-implemented method or as a computer program product.

DESCRIPTION OF THE DRAWINGS

FIG. 2 illustrates an example, non-limiting block diagram of an annotated training dataset in accordance with one or more embodiments described herein.

FIG. 4 illustrates an example, non-limiting block diagram of a domain lexicon legend in accordance with one or more embodiments described herein.

FIGS. 7-10 illustrate example, non-limiting block diagrams showing how a training dataset can be augmented via composition and substitution operations that are guided by semantic types in accordance with one or more embodiments described herein.

FIG. 11 illustrates an example, non-limiting algorithm that facilitates augmentation of a training dataset via composition and substitution operations that are guided by semantic types in accordance with one or more embodiments described herein.

FIG. 14 illustrates an example, non-limiting algorithm that facilitates augmentation of a training dataset via substitution operations that are guided by argument structures in accordance with one or more embodiments described herein.

FIGS. 15-17 illustrate example, non-limiting block diagrams showing how a training dataset can be augmented via composition and substitution operations that are guided by incoming semantic relations in accordance with one or more embodiments described herein.

FIG. 19 illustrates a flow diagram of an example, non-limiting computer-implemented method that facilitates semantics-guided domain-specific data augmentation for text-to-graph parsing in accordance with one or more embodiments described herein.

FIG. 20 illustrates a block diagram of an example, non-limiting operating environment in which one or more embodiments described herein can be facilitated.

DETAILED DESCRIPTION

Figure 1:
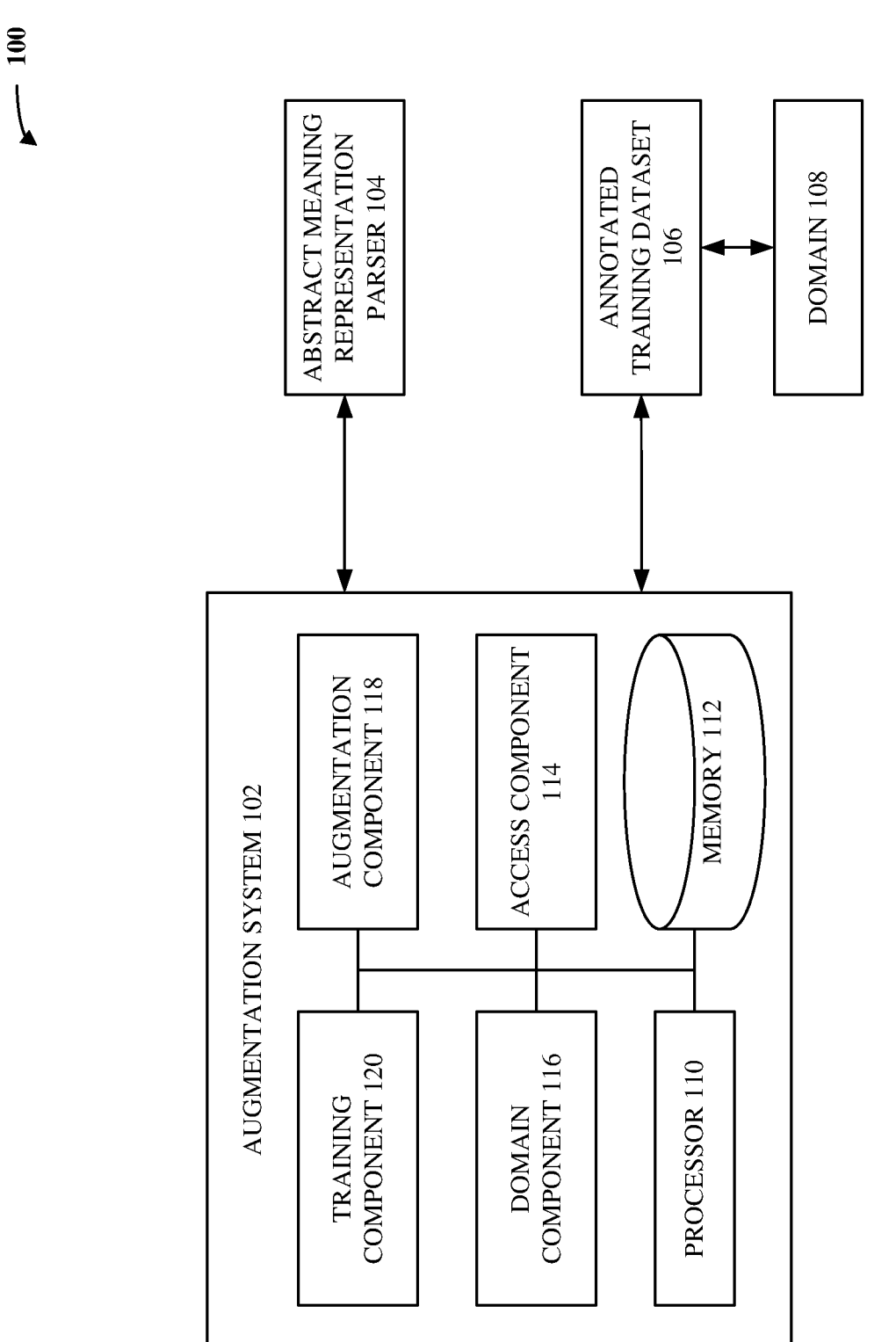
FIG. 1 illustrates a block diagram of an example, non-limiting system that facilitates semantics-guided domain-specific data augmentation for text-to-graph parsing in accordance with one or more embodiments described herein.

The following detailed description is merely illustrative and is not intended to limit embodiments or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In computing, structured databases (also referred to as knowledge bases or knowledge graphs) can be searched via execution of structured queries (e.g., queries written according to specialized syntaxes, such as structured query language (SQL) or standard query language and protocol for linked open data on web or resource description framework triple-stores (SPARQL)).

With deep learning, searches over structured databases can be performed based on natural language (e.g., unstructured, plain text) sentences. For instance, a deep learning neural network can be configured to receive as input a natural language sentence (e.g., a question is an interrogative sentence, a command is an imperative sentence) and to produce as output an abstract meaning representation (AMR) graph of that natural language sentence. The AMR graph can be a rooted directed acyclic graph that can be considered as structurally representing who does what to whom, when, where, why, or how, as conveyed by the natural language sentence. That is, nodes of the AMR graph can respectively represent concepts (e.g., nouns, verbs, named entities, attributes, quantities, dates) that are mentioned in the natural language sentence, and edges of the AMR graph can respectively represent relations (e.g., semantic roles, such as subject-of, object-of, modified-by, polarity, or mode) between concepts. Note that the AMR graph can be considered as having a root node (e.g., a top-most node toward which no relations point), one or more leaf nodes (e.g., bottom-most nodes away from which no relations point), or one or more non-leaf nodes (e.g., nodes toward which some relations point and away from which other relations point). In any case, the AMR graph produced by the deep learning neural network can be subsequently processed into a structured query that is executable over a structured database. Such deep learning neural network can be referred to as an AMR parser. By leveraging AMR parsers, users that are unfamiliar with the specific query syntax of a given structured database can nevertheless initiate searches over that given structured database. In other words, AMR parsers can be considered as increasing the accessibility of structured databases.

In order for an AMR parser to generate correct or accurate AMR graphs in response to inputted natural language sentences, the AMR parser should first undergo training. Such training can often be performed in a supervised fashion, based on annotated training data. In particular, such annotated training data can include various natural language sentences and respectively corresponding ground-truth AMR graphs, and training can involve: randomly initializing internal parameters (e.g., weight matrices, bias vectors, convolutional kernels) of the AMR parser; iteratively executing the AMR parser on such natural language sentences, thereby yielding predicted or inferred AMR graphs; and incrementally updating (e.g., via backpropagation, such as via stochastic gradient descent) the internal parameters of the AMR parser based on errors between those predicted or inferred AMR graphs and respective ground-truth AMR graphs.

Note that, after such training, the AMR parser can be considered as being able to reliably or confidently generate AMR graphs for natural language sentences that belong to whichever domains are represented in the annotated training dataset. In other words, if a particular natural language sentence utilizes vocabulary, semantic patterns, abbreviations, or jargon that was not represented in the annotated training dataset, the AMR parser cannot reliably or confidently generate an AMR graph for that particular natural language sentence. Thus, whenever it is desired to extend the AMR parser to a new, previously-unencountered domain (e.g., to new, previously-unencountered vocabulary), the AMR parser can have to undergo more training. In some cases, this can be referred to as domain adaptation, since the AMR parser can be considered as being adapted or extended to the new, previously-unencountered domain.

When various existing techniques are implemented, domain adaptation is facilitated by manually curating, via technicians or subject matter experts, a voluminous and varied annotated training dataset containing vocabulary, semantic patterns, abbreviations, or jargon of whatever new domain is desired. Unfortunately, such manual curation is exceedingly expensive and time-consuming.

To address such expense and time-consumption, other existing techniques leverage automatic data augmentation, such as Maximum Bayes Smatch Ensemble (MBSE) distillation, to automatically create a voluminous and varied annotated training dataset (which can be referred to as silver data rather than gold data). However, as recognized by the inventors of various embodiments described herein, such other existing techniques necessarily begin with very large and un-annotated raw datasets (e.g., hundreds of thousands, or even millions, of natural language sentences for which corresponding AMR graphs are not known) and can cause whatever AMR parser that is to be adapted to the new domain to exhibit reduced performance (e.g., reduced inferencing accuracy or precision).

Accordingly, systems or techniques that can address one or more of these technical problems can be desirable.

Various embodiments described herein can address one or more of these technical problems. Specifically, various embodiments described herein can facilitate semantics-guided domain-specific data augmentation for text-to-graph parsing. In particular, the present inventors recognized that various existing techniques that leverage automated data augmentation can cause an AMR parser to exhibit reduced performance, at least in part because such various existing techniques rely on general, and thus domain-neutral, data augmentation (e.g., such as MBSE distillation).

To ameliorate this issue, the present inventors devised various embodiments described herein, which can be considered as providing a domain-specific augmentation technique that can depend upon or otherwise leverage the vocabulary or semantic patterns that are unique to whatever desired domain is to be adapted. Indeed, as described herein, there can be a small annotated training dataset comprising few (e.g., a mere one hundred or two hundred) natural language sentences that utilize vocabulary or semantic patterns of the desired domain, and can further comprise ground-truth AMR graphs that are known to correspond to those natural language sentences. Furthermore, no matter the desired domain, a domain lexicon legend can be constructed as described herein, where the domain lexicon legend can be considered as a mapping between discrete lexical items (e.g., individual words or phrases) of the desired domain and respective domain-specific graphs that are known to represent those discrete lexical items. In various aspects, as described herein, the domain lexicon legend can be used to automatically augment the small annotated training dataset, via iterative application of semantics-guided graph composition operations or semantics-guided graph substitution operations. More specifically, various domain-specific graphs from the domain lexicon legend can be composed onto or substituted into various AMR graphs from the small annotated training dataset, thereby yielding new AMR graphs that are pertinent to the desired domain, and such compositions or substitutions can be in response to semantic determinations (e.g., semantic type determinations, argument structure determinations, semantic relation determinations), hence the term "semantics-guided". Moreover, commensurate with such compositions or substitutions, various discrete lexical items from the domain lexicon legend can be inserted into various natural language sentences from the small annotated training dataset, thereby yielding new natural language sentences that respectively correspond to the new AMR graphs. In this way, the small annotated training dataset can be automatically augmented (e.g., automatically enlarged) based on the domain lexicon legend, hence the term "domain-specific" as used throughout the herein disclosure.

Such semantics-guided domain-specific automatic augmentation can cause various embodiments described herein to be less expensive and less time-consuming than fully-manual existing techniques. Furthermore, as the present inventors experimentally verified, various embodiments described herein can cause the subsequently-trained AMR parser to exhibit increased performance (e.g., increased inferencing accuracy or precision), as compared to existing techniques that leverage domain-neutral augmentation.

Various embodiments described herein can be considered as a computerized tool (e.g., any suitable combination of computer-executable hardware or computer-executable software) that can facilitate semantics-guided domain-specific data augmentation for text-to-graph parsing. In various aspects, such a computerized tool can comprise an access component, a domain component, an augmentation component, or a training component.

In various embodiments, there can be an annotated training dataset. In various aspects, the annotated training dataset can be a text-to-graph dataset that corresponds to a particular domain (e.g., healthcare domain, autonomous driving domain, quantum domain, financial domain). Accordingly, in various instances, the annotated training dataset can comprise a set of natural language sentences that can contain vocabulary or semantic patterns that are uniquely or specifically used within the particular domain, and the annotated training dataset can further comprise a set of AMR graphs that are known or deemed to respectively represent the set of natural language sentences. Note that, for any given natural language sentence, the nodes of the AMR graph that corresponds to that given natural language sentence can be considered as being aligned to individual words that make up that given natural language sentence. That is, it can be known which individual nodes of that AMR graph correspond to which individual words in that given natural language sentence. However, note that such AMR graph can comprise more nodes than there are words in that given natural language sentence (e.g., so as to represent taxonomical or implied concepts), meaning that there can be an absence of a one-to-one mapping between nodes and words. In any case, the set of natural language sentences can be considered as training inputs, and the set of AMR graphs can be considered as respective ground-truths for those training inputs.

In some instances, the annotated training dataset can be curated or otherwise created manually from scratch by technicians or subject matter experts. In other instances, the annotated training dataset can be the result of applying blanket keyword-replacements to some other, already-curated dataset whose corresponding domain was known to be similar or related to the particular domain.

In various embodiments, there can be an AMR parser. In various aspects, the AMR parser can exhibit any suitable deep learning internal architecture. For example, the AMR parser can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the AMR parser can include any suitable numbers of neurons in various layers (e.g., different layers can have the same or different numbers of neurons as each other). As yet another example, the AMR parser can include any suitable activation functions (e.g., sigmoid, hyperbolic tangent, rectified linear unit) in various neurons (e.g., different neurons can have the same or different activation functions as each other). As still another example, the AMR parser can include any suitable interneuron connections or interlayer connections (e.g., forward connections, skip connections, recurrent connections).

Regardless of its internal architecture, the AMR parser can be configured to perform a text-to-graph inferencing task (otherwise known as AMR parsing). That is, the AMR parser can be configured to receive as input a natural language sentence and to predict or infer as output an AMR graph that represents that inputted natural language sentence.

In various aspects, the AMR parser can have undergone no previous training for performing the text-to-graph inferencing task with respect to the particular domain. For example, the AMR parser can have undergone no previous training at all for performing the text-to-graph inferencing task. As another example, the AMR parser can have undergone previous training for performing the text-to-graph inferencing task, but only with respect to one or more domains that are different from the particular domain.

In any case, it can be desired to train the AMR parser on the annotated training dataset, so that the AMR parser can learn how to reliably or confidently perform the text-to-graph transformation with respect to the particular domain. Because the quality or success of such training can depend upon how voluminous or varied the annotated training dataset is, it can be desired to first perform data augmentation on the annotated training dataset. In various instances, the computerized tool described herein can facilitate such data augmentation.

In various embodiments, the access component of the computerized tool can electronically receive or otherwise electronically access the AMR parser or the annotated training dataset. In some aspects, the access component can electronically retrieve the AMR parser or the annotated training dataset from any suitable centralized or decentralized data structures (e.g., graph data structures, relational data structures, hybrid data structures), whether remote from or local to the access component. In any case, the access component can electronically obtain or access the AMR parser or the annotated training dataset, such that other components of the computerized tool can electronically interact with (e.g., read, write, edit, copy, manipulate, execute) the AMR parser or with the annotated training dataset.

In various embodiments, the domain component of the computerized tool can electronically store, maintain, or otherwise access a domain lexicon legend. In various aspects, the domain lexicon legend can be any suitable electronic data that can be considered as a lexicographical guide to or list of whatever vocabulary or phraseology that is associated with the particular domain. More specifically, the domain lexicon legend can, in various aspects, comprise a set of tokens, where each token can be a unique or distinct word or phrase (as opposed to a full sentence) that is commonly, frequently, or exclusively used in the particular domain. Furthermore, the domain lexicon legend can, in various instances, comprise a set of domain-specific graphs that are known or deemed to respectively represent the set of tokens. Note that each domain-specific graph can be a rooted directed acyclic graph.

Note that, in various aspects, the domain lexicon legend can be curated or created manually from scratch by technicians or subject matter experts. In other aspects, however, the domain lexicon legend can instead be automatically extracted from the annotated training dataset. For example, when given any natural language sentence and corresponding AMR graph that are present in the annotated training dataset, one or more words from that natural language sentence can be extracted as a token, and whichever nodes of the AMR graph that are aligned to those one or more words can be extracted as a domain-specific graph that corresponds to that token.

Accordingly, the annotated training dataset can be considered as being made of up full sentences and the graphs that respectively represent those full sentences, whereas the domain lexicon legend can instead be considered as being made up of granular words or phrases and the graphs that respectively represent those granular words or phrases.

In various embodiments, the augmentation component of the computerized tool can electronically augment the annotated training dataset, by applying, based on the domain lexicon legend, semantics-guided composition operations or semantics-guided substitution operations to the annotated training dataset.

When given any two directed acyclic graphs, a graph composition operation can be performed by appending the root node of one of those two directed acyclic graphs to a leaf node of the other of those two directed acyclic graphs, thereby yielding a new directed acyclic graph. On the other hand, when given any two directed acyclic graphs, a graph substitution operation can be performed by replacing a non-leaf node and its descendant nodes (e.g., whatever nodes are nested below the non-leaf node) of one of the two directed acyclic graphs with the other of the two directed acyclic graphs, thereby yielding a new directed acyclic graph.

Accordingly, for any particular AMR graph from the annotated training dataset and for any particular domain-specific graph from the domain lexicon legend, a new AMR graph can be created by composing the particular domain-specific graph onto a leaf node of the particular AMR graph. Similarly, another new AMR graph can be created by substituting a non-leaf node and its descendants of the particular AMR graph with the particular domain-specific graph. In some aspects, such compositions or substitutions can be performed in response to semantic comparisons or semantic determinations between the particular domain-specific graph and the particular AMR graph, hence the term "semantics-guided".

As a non-limiting example, such composition or substitution can be performed in response to determining that a root node of the particular domain-specific graph possesses a same semantic type (e.g., same node label) as the leaf node or non-leaf node of the particular AMR graph. As another non-limiting example, such composition or substitution can be performed in response to determining that the root node of the particular domain-specific graph is associated with a same incoming relation (e.g., a same type of incoming edge) as the leaf node or the non-leaf node of the particular AMR graph. As even another non-limiting example, such substitution can be performed in response to determining that the root node of the particular domain-specific graph possesses a same argument structure (e.g., same number or types of outgoing edges) as the non-leaf node of the particular AMR graph.

In any case, whenever a new AMR graph is created by composing or substituting the particular domain-specific graph onto or into the particular AMR graph, a new natural language sentence can be created for that new AMR graph by leveraging node-to-token alignments. Indeed, the particular AMR graph can correspond to a particular natural language sentence, and the particular domain-specific graph can correspond to a particular token. In various cases, a new natural language sentence can be created by: identifying whichever words of the particular natural language sentence are aligned to the nodes of the particular AMR graph that were composed or substituted; and replacing those identified words with the particular token.

By performing the semantics-guided composition operations and the semantics-guided substitution operations in this way, the augmentation component can generate an augmented (e.g., enlarged, expanded) version of the annotated training dataset.

In various embodiments, the training component of the computerized tool can electronically train (e.g., in supervised fashion) the AMR parser on the augmented version of the annotated training dataset. After such training, the AMR parser can be considered as having learned how to reliably or accurately infer or predict AMR graphs for inputted natural language sentences with respect to the particular domain. Accordingly, the AMR parser can be leveraged to help expand accessibility of structured databases that pertain to the particular domain (e.g., users that desire to search through such structured databases can input, via keyboards or voice commands, natural language sentences; the AMR parser can convert those natural language sentences to AMR graphs; and such AMR graphs can be subsequently processed into structured queries that are executable over such structured databases).

Various embodiments described herein can be employed to use hardware or software to solve problems that are highly technical in nature (e.g., to facilitate semantics-guided domain-specific data augmentation for text-to-graph parsing), that are not abstract and that cannot be performed as a set of mental acts by a human. Further, some of the processes performed can be performed by a specialized computer (e.g., AMR parser). In various aspects, some defined tasks associated with various embodiments described herein can include: accessing, by a device operatively coupled to a processor, an annotated training dataset, wherein the annotated training dataset can comprise a set of abstract meaning representation graphs respectively corresponding to a set of natural language sentences; generating, by the device, an augmented version of the annotated training dataset, based on applying semantics-guided composition operations or semantics-guided substitution operations to the set of abstract meaning representation graphs; and training, by the device, an abstract meaning representation parser on the augmented version of the annotated training dataset.

Neither the human mind nor a human with pen and paper can electronically augment a training dataset comprising natural language sentences and corresponding AMR graphs, by applying semantics-guided composition or substitution operations, and electronically train an AMR parser on the augmented version of the training dataset. After all, an AMR parser is a deep learning neural network having specific trainable internal parameters (e.g., weight matrices, bias vectors, convolutional kernels). Neither the human mind nor a human with pen and paper can electronically train an AMR parser in any meaningful way. Moreover, neither the human mind nor a human with pen and paper can augment a training dataset for an AMR parser by applying graph composition or substitution operations. Accordingly, a computerized tool that can augment AMR parsing training data via semantics-guided compositions or substitutions and that can train an AMR parser on such augmented data is inherently computerized and cannot be implemented in any sensible, practicable, or reasonable way without computers.

In various instances, one or more embodiments described herein can integrate the herein-described teachings into a practical application. As mentioned above, some existing techniques for facilitating domain adaptation of an AMR parser involve manually curating a large annotated training dataset. Such existing techniques are very expensive and time-consuming. As also mentioned above, other existing techniques involve domain-neutral data augmentation (e.g., MBSE distillation). Although such other existing techniques are less expensive and time-consuming, they can cause the AMR parser to exhibit limited performance (e.g., to exhibit inferencing accuracy that is not as high as it otherwise could be).

Various embodiments described herein can address one or more of these technical problems. In particular, the present inventors realized that various existing techniques that utilize data augmentation suffer from limited AMR parser performance due, at least in part, to the fact that such existing techniques utilize domain-neutral data augmentation. To address this issue, the present inventors devised various embodiments described herein, which can be considered as augmentation strategies that take into account the idiosyncrasies of individual lexicographic domains. In particular, there can be a training dataset that corresponds to a given lexicographic domain, where the training dataset contains natural language sentences and respectively corresponding AMR graphs. Various embodiments described herein can involve augmenting that training dataset, by applying semantics-guided graph composition operations or semantics-guided graph substitution operations that are based on a lexicon legend associated with that given lexicographic domain. As described herein, the lexicon legend can, in various aspects, contain individual tokens (e.g., granular words or phrases, rather than full sentences) that are pertinent to the given lexicographic domain, and the lexicon legend can further contain domain-specific graphs that respectively represent those individual tokens (e.g., in some cases, the lexicon legend can be created from scratch by subject matter experts; in other cases, the lexicon legend can be extracted from the training dataset itself). In various instances, various embodiments described herein can involve composing or substituting various domain-specific graphs from the lexicon legend onto or into various AMR graphs from the training dataset, thereby yielding new AMR graphs, and such compositions or substitutions can be driven by or can otherwise be in response to semantic comparisons (e.g., comparisons of semantic types of nodes, comparisons of argument structures of nodes, comparisons of semantic relations between nodes). Moreover, various embodiments described herein can involve respectively generating new natural language sentences for those new AMR graphs, by leveraging node-to-token alignments. In any case, because the lexicon legend can be considered as capturing or conveying various idiosyncrasies of the given lexicographic domain, the new AMR graphs and the new natural language sentences can be considered as adding volume and variety to the training dataset in a domain-specific way, rather than in a domain-neutral way.

As the present inventors experimentally verified, training an AMR parser on data that has been augmented according to various embodiments described herein can cause the AMR parser to achieve statistically significantly increased accuracy or precision, as compared to instead training the AMR parser on data that has been augmented via existing techniques. In other words, various embodiments described herein can measurably improve the performance exhibited by an AMR parser. Thus, such embodiments can be considered as a concrete and tangible technical improvement in the field of deep learning. For at least these reasons, various embodiments described herein certainly qualify as useful and practical applications of computers.

It should be appreciated that the figures and the herein disclosure describe non-limiting examples of various embodiments. It should further be appreciated that the figures are not necessarily drawn to scale.

FIG. 1 illustrates a block diagram of an example, non-limiting system 100 that can facilitate semantics-guided domain-specific data augmentation for text-to-graph parsing in accordance with one or more embodiments described herein. As shown, an augmentation system 102 can be electronically integrated, via any suitable wired or wireless electronic connections, with an abstract meaning representation parser 104 (hereafter "AMR parser 104") and with an annotated training dataset 106.

In various embodiments, the annotated training dataset 106 can be any suitable text-to-graph dataset. Accordingly, the annotated training dataset 106 can comprise various natural language sentences, and the annotated training dataset 106 can also comprise various AMR graphs that respectively represent those natural language sentences. In various aspects, the annotated training dataset 106 can pertain to, correspond to, or otherwise be associated with a domain 108. In various instances, the domain 108 can be any suitable operational context that has its own unique lexicographical jargon or vocabulary. As a non-limiting example, the domain 108 can be a healthcare or medical domain in which healthcare-related or medical-related phraseology is often used (e.g., "symptom", "pathology", "patient"). As another non-limiting example, the domain 108 can be a quantum computing domain in which quantum-related phraseology is often used (e.g., "qubit", "coupling topology", "decoherence time"). As even another non-limiting example, the domain 108 can be an autonomous driving domain in which autonomous-driving-related phraseology is often used (e.g., "acceleration", "pedestrian", "lane change"). As yet another non-limiting example, the domain 108 can be a financial domain in which finance-related phraseology is often used (e.g., "revenue", "year-to-date", "marketing"). In any case, because the annotated training dataset 106 can pertain to the domain 108, the natural language sentences of the annotated training dataset 106 can use the unique lexicographical jargon or vocabulary of the domain 108. Various non-limiting aspects are described with respect to FIG. 2.

FIG. 2 illustrates an example, non-limiting block diagram 200 of the annotated training dataset 106 in accordance with one or more embodiments described herein.

In various embodiments, as shown, the annotated training dataset 106 can comprise a set of natural language sentences 202. In various aspects, the set of natural language sentences 202 can comprise n sentences, for any suitable positive integer n: a natural language sentence 202(1) to a natural language sentence 202(n). In various instances, each of the set of natural language sentences 202 can be any suitable interrogative, imperative, or declarative sentence (or sentence fragment) that can be written in any suitable natural language (e.g., English) and that can substantively pertain to the domain 108. As a non-limiting example, the natural language sentence 202(1) can be a first sentence being any suitable total number of words in length, where some of those words belong to the vocabulary, phraseology, or jargon that is unique or specific to the domain 108. As another non-limiting example, the natural language sentence 202(n) can be an n-th sentence being any suitable total number of words in length, where some of those words belong to the vocabulary, phraseology, or jargon that is unique or specific to the domain 108.

In various aspects, the annotated training dataset 106 can further comprise a set of abstract meaning representation graphs 204 (hereafter "AMR graphs 204"). In various instances, the set of AMR graphs 204 can respectively correspond (e.g., in one-to-one fashion) to the set of natural language sentences 202. Accordingly, since the set of natural language sentences 202 can comprise n sentences, the set of AMR graphs 204 can comprise n graphs: an AMR graph 204(1) to an AMR graph 204(2). In various cases, each of the set of AMR graphs 204 can be a directed acyclic graph that can represent the semantic structure or content of a respective one of the set of natural language sentences 202.

As a non-limiting example, the AMR graph 204(1) can correspond to the natural language sentence 202(1). Thus, the AMR graph 204(1) can be considered as representing whatever semantic structure or substance is exhibited by the natural language sentence 202(1). That is, each node of the AMR graph 204(1) can represent a respective concept (e.g., noun, verb, named entity, attribute, quantity, date) that is recited or implied in the natural language sentence 202(1), and each edge of the AMR graph 204(1) can represent a respective semantic relation (e.g., subject-of, object-of, modified-by, polarity, mode) between two concepts that are recited or implied in the natural language sentence 202(1). Accordingly, the individual nodes of the AMR graph 204(1) can be considered as being aligned or indexed to the individual words of the natural language sentence 202(1). For instance, suppose that the natural language sentence 202(1) were "What was year-to-year revenue for Health Department last quarter?". In such case, it would be known which specific nodes of the AMR graph 204(1) represent "Health Department", which specific nodes represent "year-to-year revenue", and which specific nodes represent "last quarter". Note that a top-most node (e.g., a node that has no incoming edges entering it) of the AMR graph 204(1) can be referred to as a root node. Furthermore, note that one or more bottom-most nodes (e.g., nodes that have no outgoing edges leaving them) of the AMR graph 204(1) can be referred to as leaf nodes. Further still, note that any remaining nodes (e.g., nodes that have at least one incoming edge and at least one outgoing edge) of the AMR graph 204(1) can be referred to as non-leaf nodes. For case of explanation, the leaf nodes of the AMR graph 204(1) can be denoted as one or more leaf nodes 204(1)(1), and the non-leaf nodes of the AMR graph 204(1) can be denoted as one or more non-leaf nodes 204(1)(2).

As another non-limiting example, the AMR graph 204(n) can correspond to the natural language sentence 202(n). So, the AMR graph 204(n) can be considered as representing whatever semantic structure or substance is exhibited by the natural language sentence 202(n). That is, each node of the AMR graph 204(n) can represent a respective concept that is recited or implied in the natural language sentence 202(n), and each edge of the AMR graph 204(n) can represent a respective semantic relation between two concepts that are recited or implied in the natural language sentence 202(n). Accordingly, the individual nodes of the AMR graph 204(n) can be considered as being aligned or indexed to the individual words of the natural language sentence 202(n). For instance, suppose that the natural language sentence 202(1) were "Show year-to-date expenses for Software Department three years ago". In such case, it would be known which specific nodes of the AMR graph 204(n) represent "Software Department", which specific nodes represent "year-to-date expenses", and which specific nodes represent "three years ago". Just as above, note that a top-most node of the AMR graph 204(n) can be referred to as a root node, that one or more bottom-most nodes of the AMR graph 204(n) can be referred to as leaf nodes, and that any remaining nodes of the AMR graph 204(n) can be referred to as non-leaf nodes. For case of explanation, the leaf nodes of the AMR graph 204(n) can be denoted as one or more leaf nodes 204(n)(1), and the non-leaf nodes of the AMR graph 204(n) can be denoted as one or more non-leaf nodes 204(n)(2).

In various aspects, the set of natural language sentences 202 can be considered as training inputs, and the set of AMR graphs 204 can be considered as ground-truth annotations that respectively correspond to those training inputs, hence the term "annotated".

In various instances, the annotated training dataset 106 can be generated in any suitable fashion. As a non-limiting example, the annotated training dataset 106 can, in some cases, have been curated manually by technicians or subject matter experts. As another non-limiting example, the annotated training dataset 106 can instead have been generated by applying one or more keyword-replacement operations (e.g., find-and-replace) to some other annotated training dataset that was already curated (e.g., the domain of that other annotated training dataset can have been highly similar or related to the domain 108, such that any differences between that other domain and the domain 108 can have been reconcilable with mere keyword-replacements).

Referring back to FIG. 1, the AMR parser 104 can, in various embodiments, be any suitable artificial neural network that can have or otherwise exhibit any suitable internal architecture. For instance, the AMR parser 104 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers. As a specific non-limiting example, the AMR parser 104 can exhibit a stack-transformer transition-based architecture or a bidirectional autoregressive transformer (BART) architecture.

In any case, the AMR parser 104 can, as its name suggests, be configured to perform AMR parsing. In other words, the AMR parser 104 can be configured to receive as input any suitable natural language sentence and to produce as output an AMR graph representing that inputted natural language sentence. In various aspects, the AMR parser 104 can have not yet been trained to perform AMR parsing with respect to the domain 108. That is, the AMR parser 104 can have not yet learned how to reliably, confidently, or accurately generate AMR graphs for natural language sentences that contain the vocabulary or phraseology of the domain 108. As a non-limiting example, the AMR parser 104 can have so far undergone no training whatsoever, such that the AMR parser 104 has not yet learned how to reliably, confidently, or accurately generate AMR graphs for any natural language sentences. As another non-limiting example, the AMR parser 104 can instead have undergone training only with respect to one or more other domains that are different from the domain 108, such that the AMR parser 104 has learned how to reliably, confidently, or accurately generate AMR graphs only for natural language sentences that contain the vocabularies or phraseologies of those one or more other domains.

In order to teach the AMR parser 104 how to reliably, confidently, or accurately generate AMR graphs for natural language sentences that contain the vocabulary or phraseology of the domain 108, it can be desired to train the AMR parser 104 on the annotated training dataset 106. However, to help increase the effectiveness of such training, it can be desired to first augment the annotated training dataset 106. In various aspects, the augmentation system 102 can facilitate such augmentation, as described herein.

In various embodiments, the augmentation system 102 can comprise a processor 110 (e.g., computer processing unit, microprocessor) and a non-transitory computer-readable memory 112 that is operably connected or coupled to the processor 110. The non-transitory computer-readable memory 112 can store computer-executable instructions which, upon execution by the processor 110, can cause the processor 110 or other components of the augmentation system 102 (e.g., access component 114, domain component 116, augmentation component 118, training component 120) to perform one or more acts. In various embodiments, the non-transitory computer-readable memory 112 can store computer-executable components (e.g., access component 114, domain component 116, augmentation component 118, training component 120), and the processor 110 can execute the computer-executable components.

In various embodiments, the augmentation system 102 can comprise an access component 114. In various aspects, the access component 114 can electronically receive or otherwise electronically access the AMR parser 104 or the annotated training dataset 106. In various instances, the access component 114 can electronically retrieve the AMR parser 104 or the annotated training dataset 106 from any suitable centralized or decentralized data structures (not shown) or from any suitable centralized or decentralized computing devices (not shown). In any case, the access component 114 can electronically obtain or access the AMR parser 104 or the annotated training dataset 106, such that other components of the augmentation system 102 can electronically interact with the AMR parser 104 or with the annotated training dataset 106.

In various embodiments, the augmentation system 102 can comprise a domain component 116. In various aspects, as described herein, the domain component 116 can access a domain lexicon legend that corresponds to the domain 108.

In various embodiments, the augmentation system 102 can comprise an augmentation component 118. In various instances, as described herein, the augmentation component 118 can generate an augmented version of the annotated training dataset 106, by applying semantics-guided composition or substitution operations that are based on the domain lexicon legend.

In various embodiments, the augmentation system 102 can comprise a training component 120. In various cases, as described herein, the training component 120 can train the AMR parser 104 on the augmented version of the annotated training dataset 106.

Figure 3:
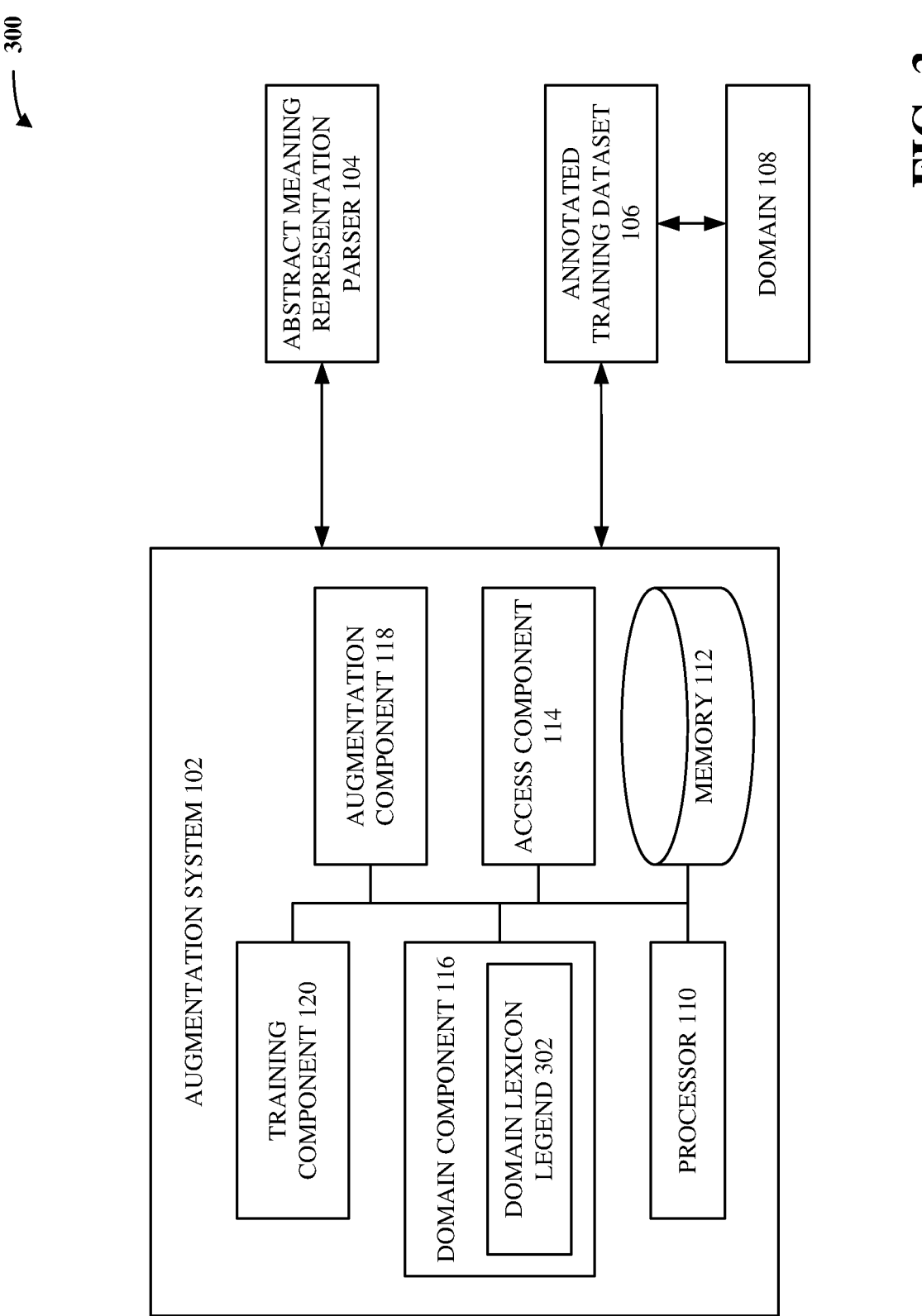
FIG. 3 illustrates a block diagram of an example, non-limiting system including a domain lexicon legend that facilitates semantics-guided domain-specific data augmentation for text-to-graph parsing in accordance with one or more embodiments described herein.

FIG. 3 illustrates a block diagram of an example, non-limiting system 300 including a domain lexicon legend that can facilitate semantics-guided domain-specific data augmentation for text-to-graph parsing in accordance with one or more embodiments described herein. As shown, the system 300 can, in some cases, comprise the same components as the system 100, and can further comprise a domain lexicon legend 302.

In various embodiments, the domain component 116 can electronically store, electronically maintain, or otherwise electronically access (e.g., from any suitable source) the domain lexicon legend 302. In various aspects, the domain lexicon legend 302 can be any suitable electronic data that can be considered as a guide to, roadmap for, or dictionary-like listing of the vocabulary or phraseology that is unique or specific to the domain 108. In particular, the domain lexicon legend 302 can contain various granular terms or phrases that are used frequently or exclusively in the domain 108, and the domain lexicon legend 302 can further contain domain-specific graphs respectively representing those granular terms or phrases. Various non-limiting aspects are described with respect to FIG. 4.

FIG. 4 illustrates an example, non-limiting block diagram 400 of the domain lexicon legend 302 in accordance with one or more embodiments described herein.

In various embodiments, as shown, the domain lexicon legend 302 can comprise a set of domain-specific tokens 402. In various aspects, the set of domain-specific tokens 402 can comprise p tokens, for any suitable positive integer p: a domain-specific token 402(1) to a domain-specific token 402(p). In various instances, each of the set of domain-specific tokens 402 can be any suitable discrete lexical item that is used frequently or exclusively in the domain 108, hence the term "domain-specific". As a non-limiting example, the domain-specific token 402(1) can be one or more first words (e.g., which can amount to a first entity name, a first abbreviation, a first superlative, or a first comparative) that are used uniquely or specifically in the domain 108. As another non-limiting example, the domain-specific token 402(p) can be one or more p-th words (e.g., which can amount to a p-th entity name, a p-th abbreviation, a p-th superlative, or a p-th comparative) that are used uniquely or specifically in the domain 108.

In various aspects, the domain lexicon legend 302 can further comprise a set of domain-specific graphs 404. In various instances, the set of domain-specific graphs 404 can respectively correspond (e.g., in one-to-one fashion) to the set of domain-specific tokens 402. Accordingly, since the set of domain-specific tokens 402 can comprise p tokens, the set of domain-specific graphs 404 can comprise p graphs: a domain-specific graph 404(1) to a domain-specific graph 404(p). In various cases, each of the set of domain-specific graphs 404 can be a directed acyclic graph that can represent the semantic structure or content of a respective one of the set of domain-specific tokens 402.

As a non-limiting example, the domain-specific graph 404(1) can correspond to the domain-specific token 402(1). Thus, the domain-specific graph 404(1) can be considered as representing whatever semantic structure or substance is exhibited by the domain-specific token 402(1). That is, each node of the domain-specific graph 404(1) can represent a respective concept that is recited or implied in the domain-specific token 402(1), and each edge of the domain-specific graph 404(1) can represent a respective semantic relation between two concepts that are recited or implied in the domain-specific token 402(1). Just as above, note that a top-most node of the domain-specific graph 404(1) can be referred to as a root node, that one or more bottom-most nodes of the domain-specific graph 404(1) can be referred to as leaf nodes, and that any remaining nodes of the domain-specific graph 404(1) can be referred to as non-leaf nodes. For case of explanation, the root node of the domain-specific graph 404(1) can be denoted as root node 404(1)(1).

As another non-limiting example, the domain-specific graph 404(p) can correspond to the domain-specific token 402(p). So, the domain-specific graph 404(p) can be considered as representing whatever semantic structure or substance is exhibited by the domain-specific token 402(p). That is, each node of the domain-specific graph 404(p) can represent a respective concept that is recited or implied in the domain-specific token 402(p), and each edge of the domain-specific graph 404(p) can represent a respective semantic relation between two concepts that are recited or implied in the domain-specific token 402(p). Again, just as above, note that a top-most node of the domain-specific graph 404(p) can be referred to as a root node, that one or more bottom-most nodes of the domain-specific graph 404(p) can be referred to as leaf nodes, and that any remaining nodes of the domain-specific graph 404(p) can be referred to as non-leaf nodes. For ease of explanation, the root node of the domain-specific graph 404(p) can be denoted as root node 404(p)(1).

Thus, each of the set of domain-specific graphs 404 can be considered as an AMR graph representing a respective one of the set of domain-specific tokens 402.

In various aspects, the domain lexicon legend 302 can be generated in any suitable fashion. As a non-limiting example, the domain lexicon legend 302 can, in some cases, have been curated manually by technicians or subject matter experts based on any suitable information resources or corpora that are specific to the domain 108. As another non-limiting example, the domain lexicon legend 302 can instead have been extracted from the annotated training dataset 106. For instance, consider any given natural language sentence from the set of natural language sentences 202, and also consider whichever AMR graph from the set of AMR graphs 204 that corresponds to that natural language sentence. In various cases, the domain-specific token 402(1) can be any discrete lexical item that is present in that natural language sentence, and the domain-specific graph 404(1) can be whichever subgraph (e.g., whichever nodes or edges) of that AMR graph that is aligned to that discrete lexical item.

In any case, the annotated training dataset 106 can be considered as containing full sentences (e.g., 202) and their corresponding AMR graphs (e.g., 204), whereas the domain lexicon legend 302 can instead be considered as containing granular lexical items (e.g., 402) and their corresponding AMR graphs (e.g., 404).

Figure 5:
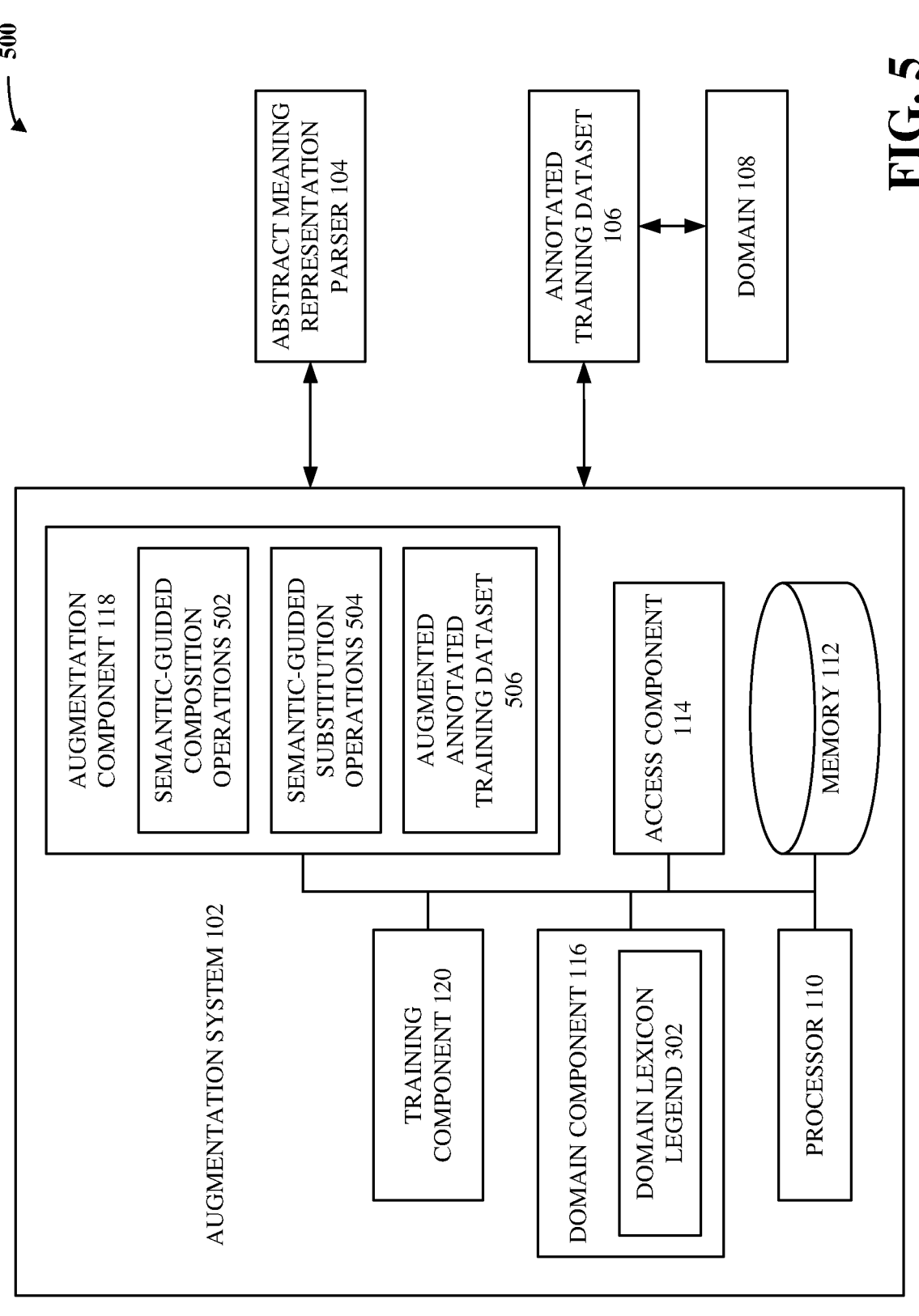
FIG. 5 illustrates a block diagram of an example, non-limiting system including an augmented training dataset generated via semantics-guided composition or substitution operations that facilitates semantics-guided domain-specific data augmentation for text-to-graph parsing in accordance with one or more embodiments described herein.

FIG. 5 illustrates a block diagram of an example, non-limiting system 500 including an augmented annotated training dataset generated via semantics-guided composition or substitution operations that can facilitate semantics-guided domain-specific data augmentation for text-to-graph parsing in accordance with one or more embodiments described herein. As shown, the system 500 can, in some cases, comprise the same components as the system 300, and can further comprise one or more semantics-guided composition operations 502, one or more semantics-guided substitution operations 504, and an augmented annotated training dataset 506.

In various embodiments, the one or more semantics-guided composition operations 502 can be any suitable number of graph composition operations that can be driven by or otherwise performed in response to one or more semantic determinations, hence the term "semantics-guided". Likewise, in various aspects, the one or more semantics-guided substitution operations 504 can be any suitable number of graph substitution operations that can be driven by or otherwise performed in response to one or more semantic determinations, again hence the term "semantics-guided". In various instances, the augmentation component 118 can electronically perform the one or more semantics-guided composition operations 502 or the one or more semantics-guided substitution operations 504 on the annotated training dataset 106 and based on the domain lexicon legend 302. Such performance of the one or more semantics-guided composition operations 502 or of the one or more semantics-guided substitution operations 504 can convert the annotated training dataset 106 into the augmented annotated training dataset 506. Various non-limiting aspects are described with respect to FIGS. 6-18.

Figure 6:
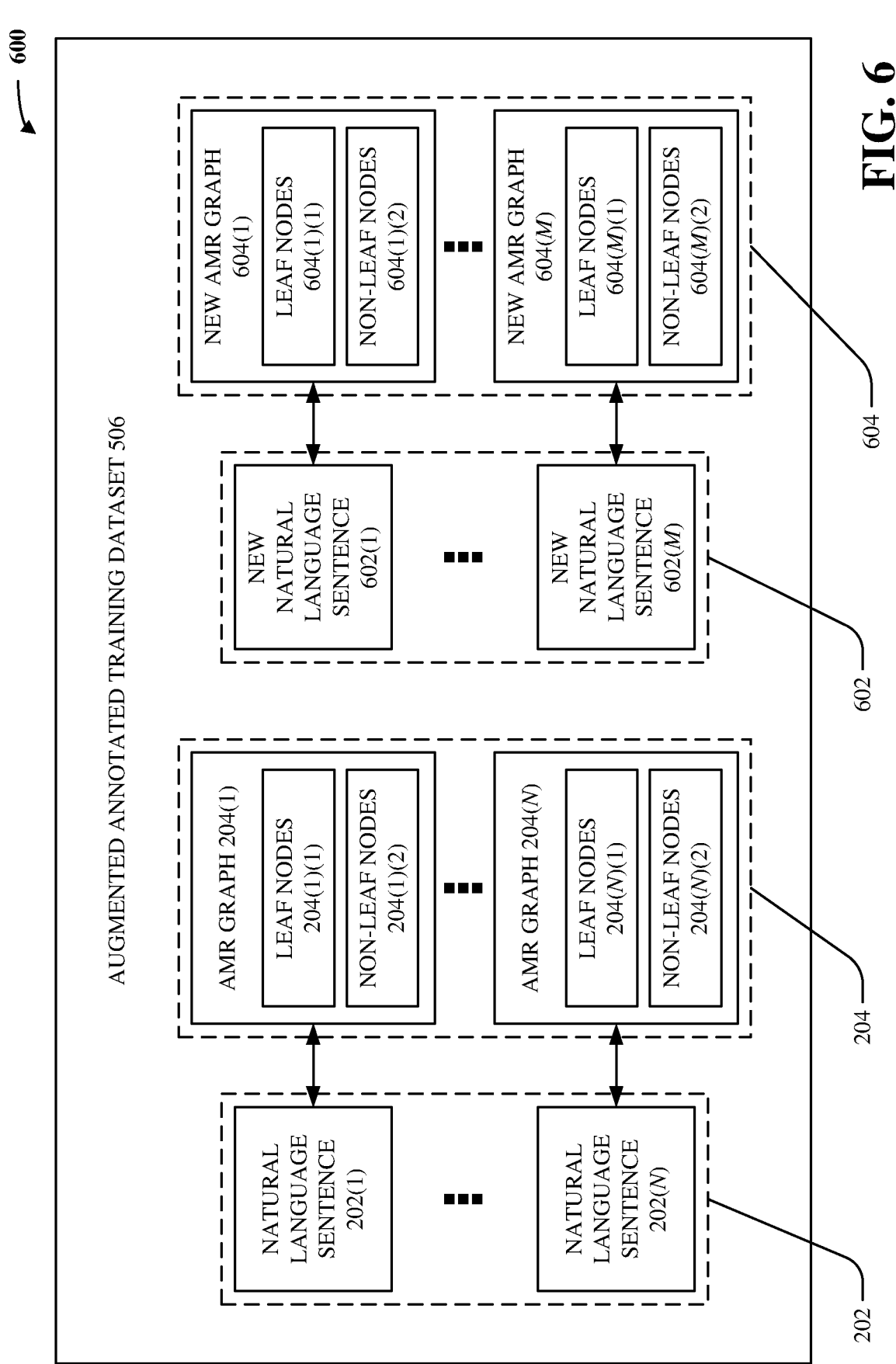
FIG. 6 illustrates an example, non-limiting block diagram of an augmented training dataset in accordance with one or more embodiments described herein.

FIG. 6 illustrates an example, non-limiting block diagram 600 of the augmented annotated training dataset 506 in accordance with one or more embodiments described herein. As shown, the augmented annotated training dataset 506 can comprise the set of natural language sentences 202 and the set of AMR graphs 204.

In various embodiments, as also shown, the augmented annotated training dataset 506 can further comprise a set of new natural language sentences 602 and a set of new AMR graphs 604. In various aspects, the set of new natural language sentences 602 can comprise m sentences, for any suitable positive integer m: a new natural language sentence 602(1) to a new natural language sentence 602(m). In various instances, the set of new AMR graphs 604 can respectively correspond (e.g., in one-to-one fashion) to the set of new natural language sentences 602. Accordingly, since the set of new natural language sentences 602 can comprise m sentences, the set of new AMR graphs 604 can comprise m graphs: a new AMR graph 604(1) to a new AMR graph 604(m). In various cases, each of the set of new AMR graphs 604 can be a directed acyclic graph that can represent the semantic structure or content of a respective one of the set of new natural language sentences 602.

As a non-limiting example, the new AMR graph 604(1) can correspond to the new natural language sentence 602(1). Thus, the new AMR graph 604(1) can be considered as representing whatever semantic structure or substance is exhibited by the new natural language sentence 602(1). Note that a top-most node of the new AMR graph 604(1) can be referred to as a root node, that one or more bottom-most nodes of the new AMR graph 604(1) can be referred to as leaf nodes, and that any remaining nodes of the new AMR graph 604(1) can be referred to as non-leaf nodes. For case of explanation, the leaf nodes of the new AMR graph 604(1) can be denoted as one or more leaf nodes 604(1)(1), and the non-leaf nodes of the new AMR graph 604(1) can be denoted as one or more non-leaf nodes 604(1)(2).

As another non-limiting example, the new AMR graph 604(m) can correspond to the new natural language sentence 602(m). So, the new AMR graph 604(m) can be considered as representing whatever semantic structure or substance is exhibited by the new natural language sentence 602(m). As above, note that a top-most node of the new AMR graph 604($m$) can be referred to as a root node, that one or more bottom-most nodes of the new AMR graph 604($m$) can be referred to as leaf nodes, and that any remaining nodes of the new AMR graph 604($m$) can be referred to as non-leaf nodes. For ease of explanation, the leaf nodes of the new AMR graph 604($m$) can be denoted as one or more leaf nodes 604($m$)(1), and the non-leaf nodes of the new AMR graph 604($m$) can be denoted as one or more non-leaf nodes 604($m$)(2).

In any case, as shown, the augmented annotated training dataset 506 can be considered as an enlarged version of the annotated training dataset 106. In various aspects, the augmentation component 118 can facilitate such enlargement via the one or more semantics-guided composition operations 502 or the one or more semantics-guided substitution operations 504. More specifically, the augmentation component 118 can generate the set of new natural language sentences 602 and the set of new AMR graphs 604, by applying the one or more semantics-guided composition operations 502 or the one or more semantics-guided substitution operations 504 to the annotated training dataset 106 and to the domain lexicon legend 302. More specifically still, the augmentation component 118 can generate the set of new natural language sentences 602 and the set of new AMR graphs 604, by composing or substituting various of the set of domain-specific graphs 404 onto or into various of the set of AMR graphs 204, in response to various semantic determinations.

In some cases, such semantic determinations can involve determining whether nodes in any of the set of domain-specific graphs 404 have same semantic types or labels as nodes in any of the set of AMR graphs 204. Such embodiments are described in non-limiting fashion with respect to FIGS. 7-11. In other cases, such semantic determinations can involve determining whether nodes in any of the set of domain-specific graphs 404 have same argument structures as nodes in any of the set of AMR graphs 204. Such embodiments are described in non-limiting fashion with respect to FIGS. 12-14. In even other cases, such semantic determinations can involve determining whether nodes in any of the set of domain-specific graphs 404 have same incoming semantic relations as nodes in any of the set of AMR graphs 204. Such embodiments are described in non-limiting fashion with respect to FIGS. 15-18.

FIGS. 7-10 illustrate example, non-limiting block diagrams 700, 800, 900, and 1000 showing how the annotated training dataset 106 can be augmented via composition and substitution operations that are guided by semantic types in accordance with one or more embodiments described herein.

Figure 7:
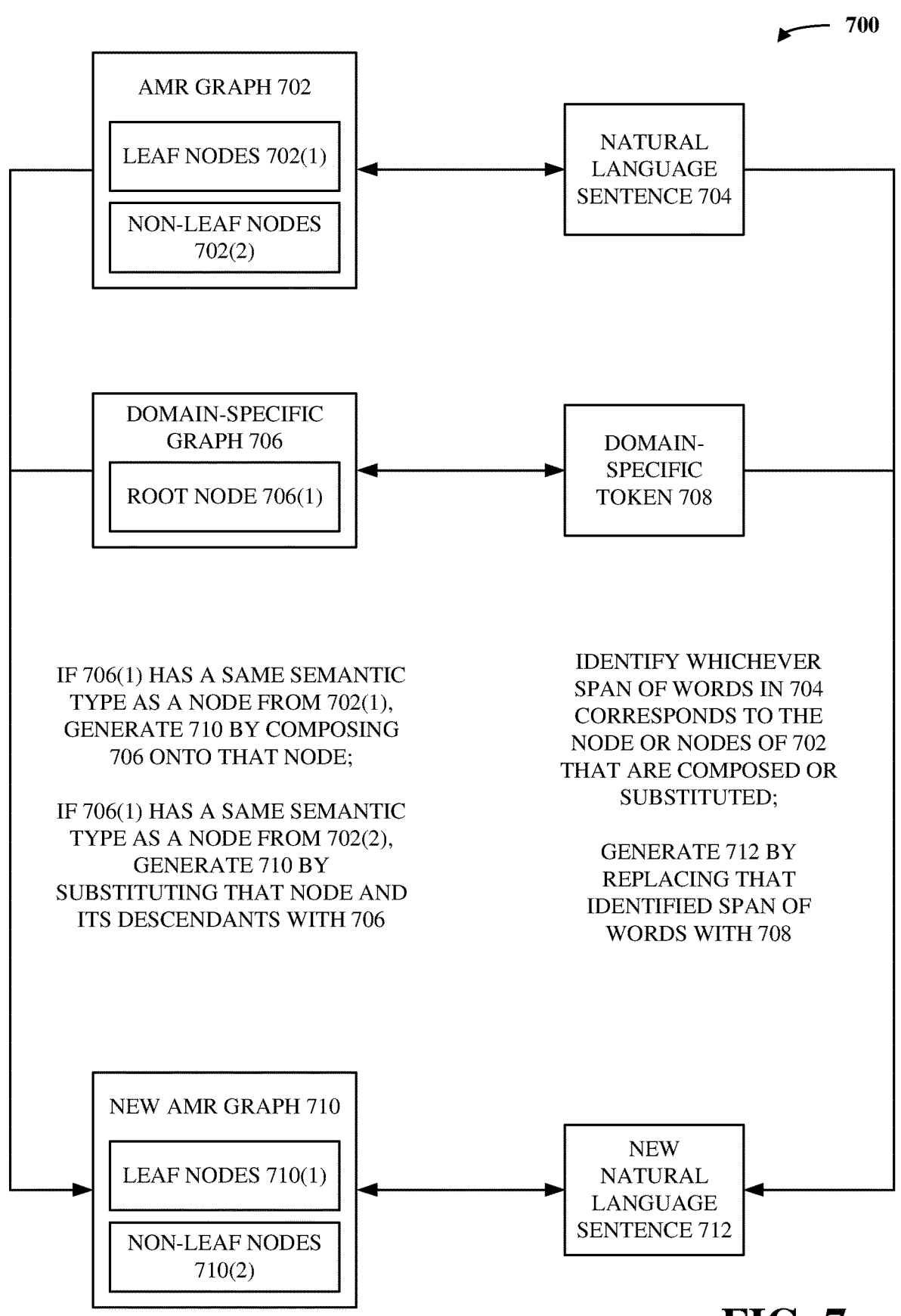

First, consider FIG. 7. In various aspects, the augmentation component 118 can select any of the set of AMR graphs 204. In various instances, such selected AMR graph can be referred to as an AMR graph 702, which can have one or more leaf nodes 702(1) and one or more non-leaf nodes 702(2). In various cases, a natural language sentence 704 can be whichever one of the set of natural language sentences 202 that is represented by the AMR graph 702. Furthermore, the augmentation component 118 can select any of the set of domain-specific graphs 404. In various aspects, such selected domain-specific graph can be referred to as a domain-specific graph 706, which can have a root node 706(1). In various instances, a domain-specific token 708 can be whichever one of the set of domain-specific tokens 402 that is represented by the domain-specific graph 706.

Now, in various embodiments, the augmentation component 118 can electronically generate any of the set of new AMR graphs 604, based on the AMR graph 702 and based on the domain-specific graph 706. Moreover, in various instances, the augmentation component 118 can electronically generate whichever one of the set of new natural language sentences 602 that is represented by that new AMR graph, based on the natural language sentence 704 and based on the domain-specific token 708. In various aspects, that new AMR graph can be referred to as a new AMR graph 710, which can have one or more leaf nodes 710(1) and one or more non-leaf nodes 710(2), and that new natural language sentence can be referred to as a new natural language sentence 712.

In various instances, the augmentation component 118 can generate the new AMR graph 710, based on a semantic type comparison between the domain-specific graph 706 and the AMR graph 702.

As a non-limiting example, the augmentation component 118 can determine whether or not the root node 706(1) has a same or matching semantic type (e.g., same or matching node label) as any of the one or more leaf nodes 702(1). In response to determining that the root node 706(1) does have a same or matching semantic type as some particular leaf node of the one or more leaf nodes 702(1), the augmentation component 118 can compose the domain-specific graph 706 onto that particular leaf node. In such case, the result of such composition can be the new AMR graph 710. Note that this can be considered as a non-limiting example of the one or more semantics-guided composition operations 502.

As another non-limiting example, the augmentation component 118 can determine whether or not the root node 706(1) has a same or matching semantic type (e.g., same or matching node label) as any of the one or more non-leaf nodes 702(2). In response to determining that the root node 706(1) does have a same or matching semantic type as some particular non-leaf node of the one or more non-leaf nodes 702(2), the augmentation component 118 can substitute that particular non-leaf node, and all of the descendant nodes that are nested beneath that particular non-leaf node, with the domain-specific graph 706. In such case, the result of such substitution can be the new AMR graph 710. Note that this can be considered as a non-limiting example of the one or more semantics-guided substitution operations 504.

Accordingly, as shown in FIG. 7, the augmentation component 118 can generate the new AMR graph 710, by composing or substituting the domain-specific graph 706 onto or into the AMR graph 702.

In various aspects, the augmentation component 118 can electronically generate the new natural language sentence 712, based on the natural language sentence 704 and based on the domain-specific token 708. In particular, as mentioned above, the nodes of the AMR graph 702 can be aligned to the words of the natural language sentence 704. Accordingly, in various instances, the augmentation component 118 can identify whichever span of words of the natural language sentence 704 corresponds to (e.g., is aligned with) the node or nodes of the AMR graph 702 that were composed or substituted. In various cases, the augmentation component 118 can replace that identified span of words with the domain-specific token 708. Such replacement can be considered as converting the natural language sentence 704 into the new natural language sentence 712.

As FIG. 7 shows, the augmentation component 118 can generate various of the set of new AMR graphs 604 and various of the set of new natural language sentences 602, via graph compositions or graph substitutions that are performed in response to semantic-type-based determinations.

Figure 9:
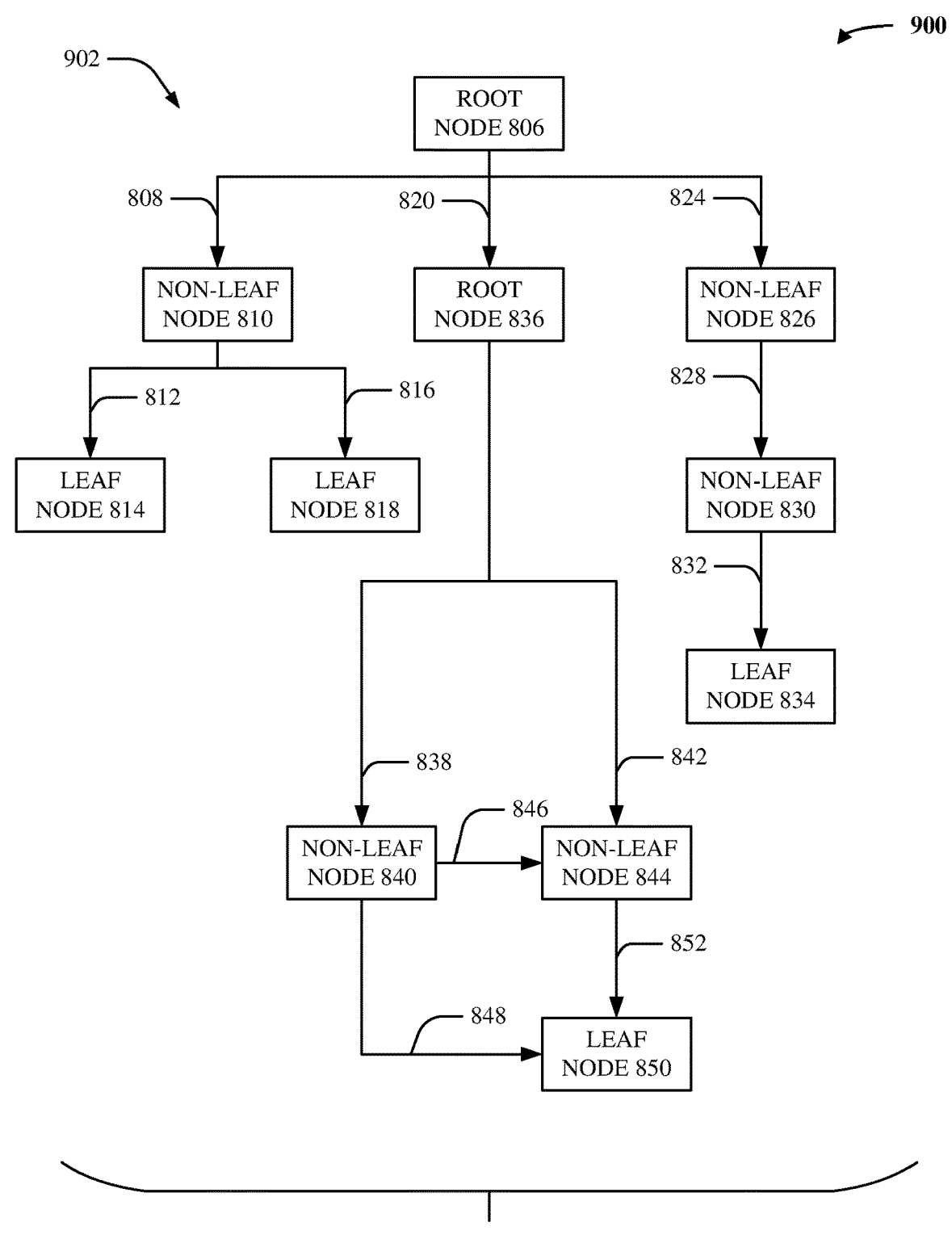
Figure 10:
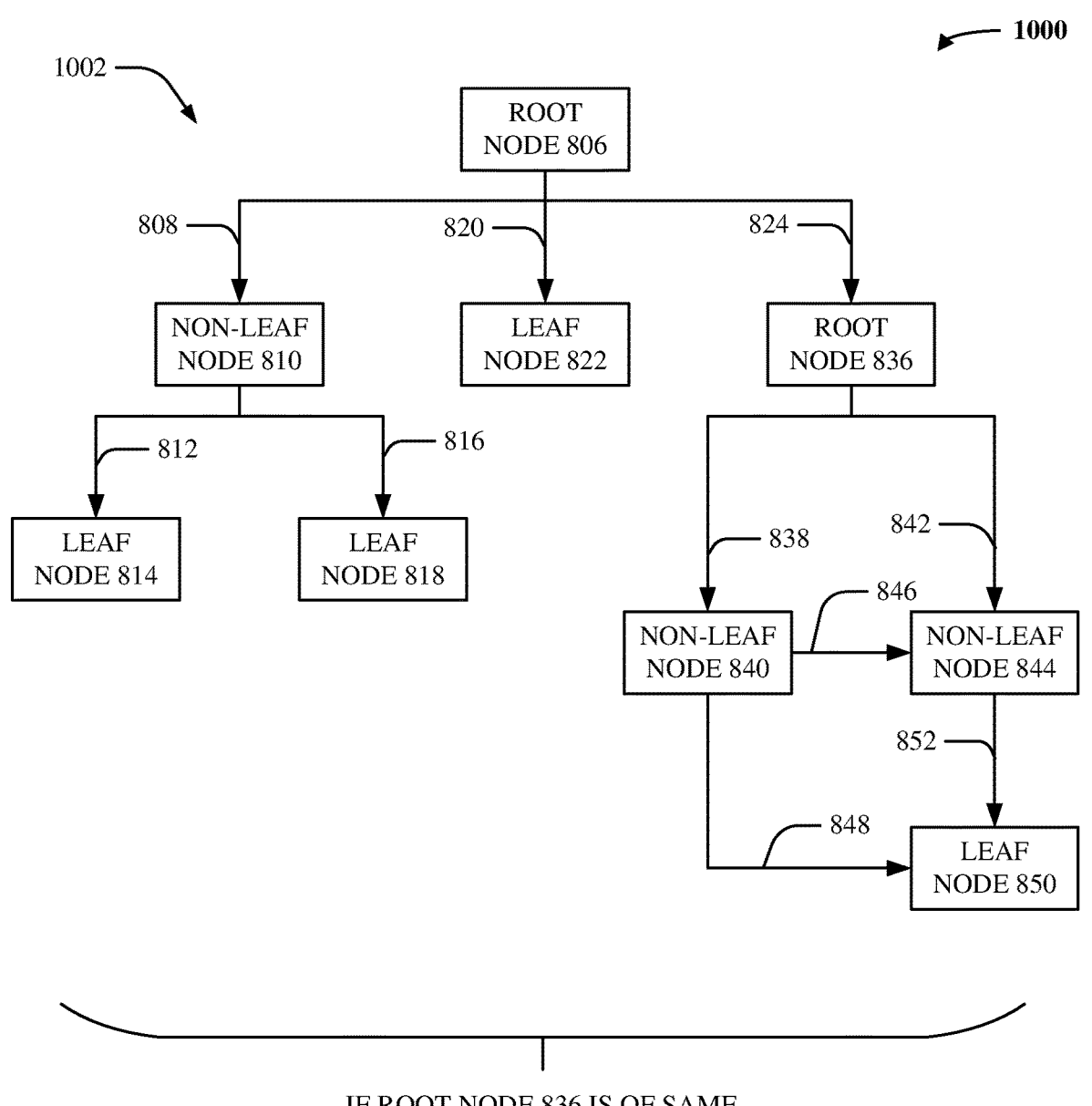

For non-limiting illustrative clarity, consider FIGS. 8-10. FIG. 8 depicts an AMR graph 802 (e.g., one of 204) and a domain-specific graph 804 (e.g., one of 404). As shown, the AMR graph 802 can comprise: a root node 806; a semantic relation 808 that couples the root node 806 to a non-leaf node 810; a semantic relation 812 that couples the non-leaf node 810 to a leaf node 814; a semantic relation 816 that couples the non-leaf node 810 to a leaf node 818; a semantic relation 820 that couples the root node 806 to a leaf node 822; a semantic relation 824 that couples the root node 806 to a non-leaf node 826; a semantic relation 828 that couples the non-leaf node 826 to a non-leaf node 830; and a semantic relation 832 that couples the non-leaf node 830 to a leaf node 834. As also shown, the domain-specific graph 804 can comprise: a root node 836; a semantic relation 838 that couples the root node 836 to a non-leaf node 840; a semantic relation 842 that couples the root node 836 to a non-leaf node 844; a semantic relation 846 that couples the non-leaf node 840 to the non-leaf node 844; a semantic relation 848 that couples the non-leaf node 840 to a leaf node 850; and a semantic relation 852 that couples the non-leaf node 844 to the leaf node 850.

Now, consider FIG. 9. In various aspects, the augmentation component 118 can determine whether the root node 836 has a same semantic type (e.g., has a same label) as the leaf node 822. In response to determining that the root node 836 does have a same semantic type as the leaf node 822, the augmentation component 118 can compose the domain-specific graph 804 onto the leaf node 822. Such composition, which can be considered as a non-limiting example of a semantics-guided graph composition operation, can yield a new AMR graph 902 (e.g., one of 604). Moreover, although not explicitly shown in FIG. 9, the augmentation component 118 can generate a new natural language sentence (e.g., one of 602) for the new AMR graph 902, based on whatever natural language sentence (e.g., one of 202) is represented by the AMR graph 802 and based on whatever domain-specific token (e.g., one of 402) is represented by the domain-specific graph 804. In particular, the augmentation component 118 can identify whatever span of words in the natural language sentence that is represented by the AMR graph 802 is aligned with the leaf node 822, and the augmentation component 118 can replace that identified span of words with the domain-specific token represented by the domain-specific graph 804.

Note that the term "root node 836" is maintained in FIG. 9 for sake of naming consistency, notwithstanding that the root node 836 is not a top-most node of the new AMR graph 902.

Now, consider FIG. 10. In various aspects, the augmentation component 118 can determine whether the root node 836 has a same semantic type (e.g., has a same label) as the non-leaf node 826. In response to determining that the root node 836 does have a same semantic type as the non-leaf node 826, the augmentation component 118 can substitute the non-leaf node 826 and all of its descendant nodes (e.g., the non-leaf node 830 and the leaf node 834) with the domain-specific graph 804. Such substitution, which can be considered as a non-limiting example of a semantics-guided graph substitution operation, can yield a new AMR graph 1002 (e.g., one of 604). Moreover, although not explicitly shown in FIG. 10, the augmentation component 118 can generate a new natural language sentence (e.g., one of 602) for the new AMR graph 1002, based on the natural language sentence that is represented by the AMR graph 802 and based on the domain-specific token that is represented by the domain-specific graph 804. Indeed, as above, the augmentation component 118 can identify whatever span of words in the natural language sentence that is represented by the AMR graph 802 is aligned with the non-leaf node 826 and with its descendant nodes (e.g., with the non-leaf node 830 and with the leaf node 834), and the augmentation component 118 can replace that identified span of words with the domain-specific token represented by the domain-specific graph 804.

Note that the term "root node 836" is maintained in FIG. 10 for sake of naming consistency, notwithstanding that the root node 836 is not a top-most node of the new AMR graph 1002.

FIG. 11 illustrates an example, non-limiting algorithm 1100 that can facilitate augmentation of a training dataset via composition and substitution operations that are guided by semantic types in accordance with one or more embodiments described herein.

In various embodiments, as shown by numeral 1102, the algorithm 1100 can include accessing a set of AMR graphs (e.g., 204) and a respectively corresponding set of sentences (e.g., 202). In various cases, the set of AMR graphs can be denoted mathematically as $G=\{g_1, \ldots, g_x\}$, for any suitable positive integer x, and the set of sentences can be denoted mathematically as $T=\{t_1, \ldots, t_x\}$.

In various aspects, as shown by numeral 1104, the algorithm 1100 can include accessing a set of domain-specific graphs (e.g., 404) and a respectively corresponding set of text tokens (e.g., 402). In various cases, the set of domain-specific graphs can be denoted mathematically as $SG=\{sg_1, \ldots, sg_y\}$, for any suitable positive integer y, and the set of text tokens can be denoted mathematically as $ST=\{st_1, \ldots, st_y\}$.

In various instances, as shown by numeral 1106, the algorithm 1100 can initiate a for-loop, with an index i ranging from 1 to x.

In various cases, as shown by numeral 1108, the algorithm 1100 can initiate another for-loop, with an index j ranging from 1 to y.

In various aspects, as shown by numeral 1110, the algorithm 1100 can iterate through all leaf nodes of $g_i$ (e.g., through all leaf nodes of 702).

In various instances, as shown by numeral 1112, the algorithm 1100 can include a condition of an if-loop, which can ask whether the semantic type (e.g., the node label) of the root node of $sg_j$ (e.g., the root node of 706) is the same as the semantic type of the currently-considered leaf node of $g_i$. If it is the case that the semantic type of the root node of $sg_j$ is the same as the semantic type of the currently-considered leaf node of $g_i$, then the algorithm 1100 can perform various actions, as shown by numerals 1114 and 1116.

In various aspects, numeral 1116 can include generating a new graph (e.g., 710), by composing $sg_j$ with or onto the currently-considered leaf node of $g_i$. In various instances, numeral 1118 can include generating a new sentence (e.g., 712) for that new graph, by replacing with $st_j$ whichever word span of $t_i$ is aligned to the currently-considered leaf node of $g_i$.

In various aspects, as shown by numeral 1118, the algorithm 1100 can iterate through all non-leaf nodes of $g_i$ (e.g., through all non-leaf nodes of 702).

In various instances, as shown by numeral 1120, the algorithm 1100 can include a condition of another if-loop, which can ask whether the semantic type (e.g., the node label) of the root node of $sg_j$ is the same as the semantic type of the currently-considered non-leaf node of $g_i$. If it is the case that the semantic type of the root node of $sg_j$ is the same as the semantic type of the currently-considered non-leaf node of $g_i$, then the algorithm 1100 can perform various actions, as shown by numerals 1122 and 1124.

In various aspects, numeral 1122 can include generating a new graph (e.g., 710), by substituting the currently-considered non-leaf node of $g_i$ and its descendant (e.g., below-nested) nodes with $sg_j$. In various instances, numeral 1124 can include generating a new sentence (e.g., 712) for that new graph, by replacing with $st_j$ whichever word span of $t_i$ is aligned to the currently-considered non-leaf node of $g_i$ and to its descendant nodes.

In various cases, as shown by numeral 1126, the algorithm 1100 can end.

Figure 12:
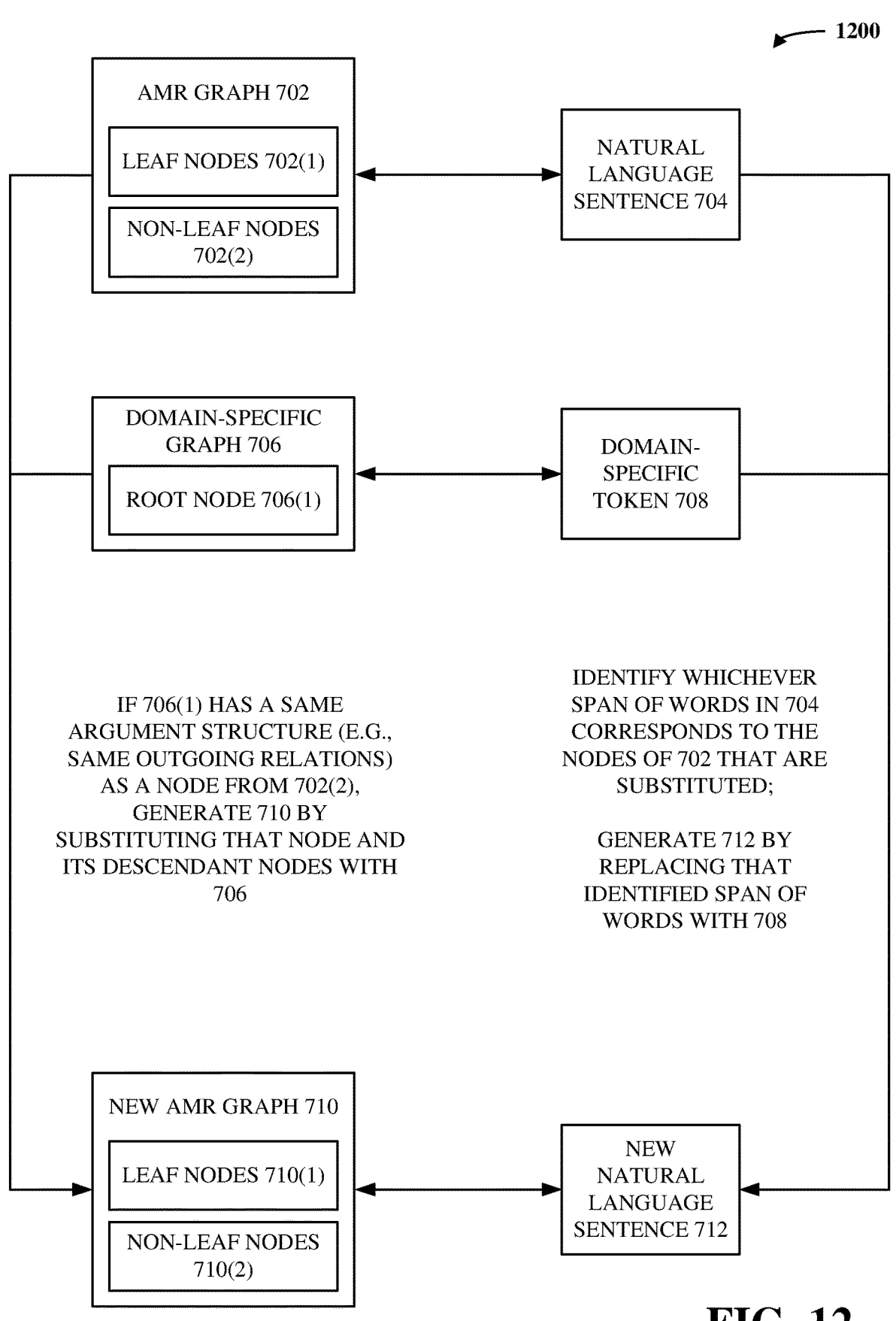
FIGS. 12-13 illustrate example, non-limiting block diagrams showing how a training dataset can be augmented via substitution operations that are guided by argument structures in accordance with one or more embodiments described herein.
Figure 13:
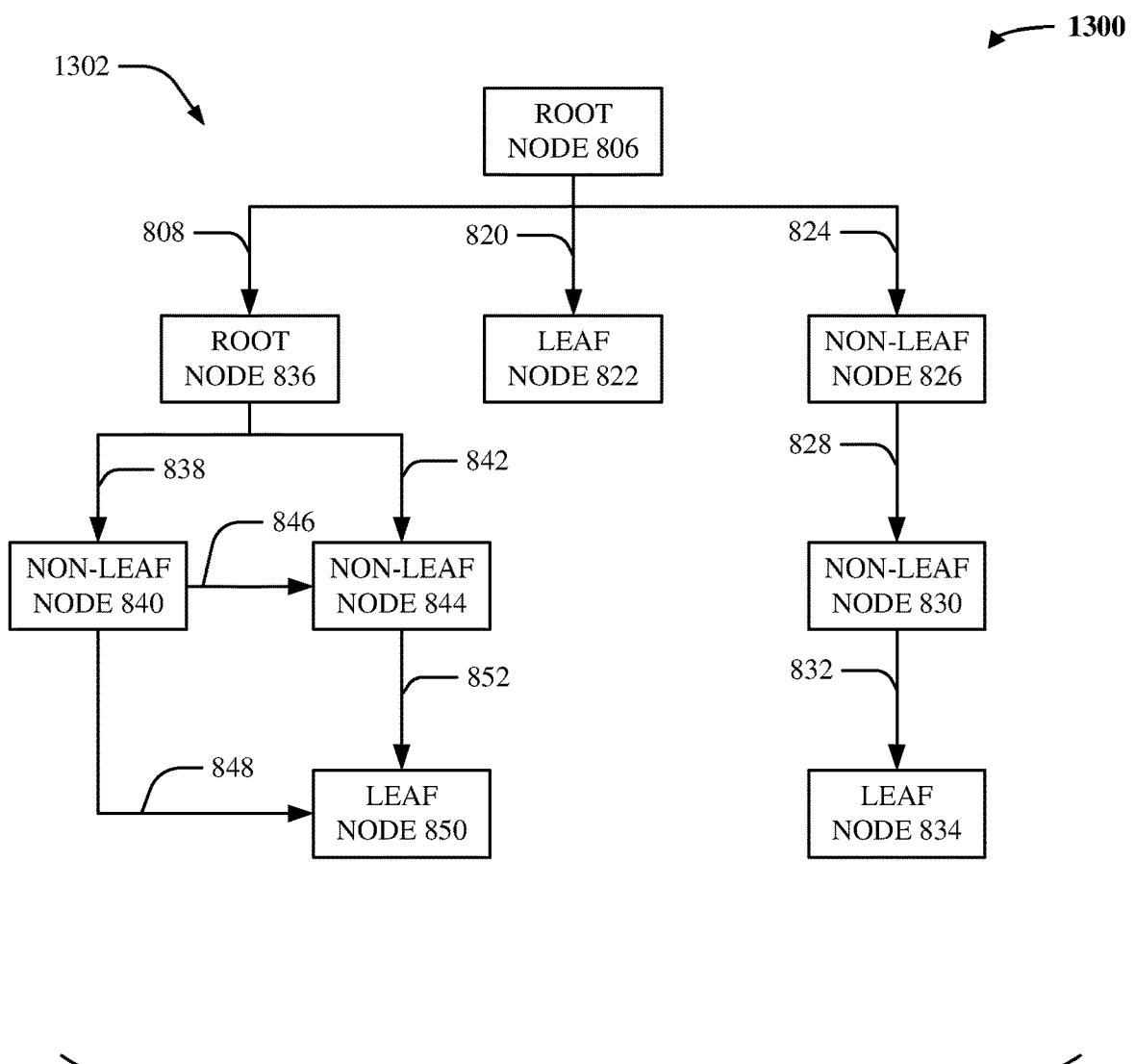

FIGS. 12-13 illustrate example, non-limiting block diagrams 1200 and 1300 showing how a training dataset can be augmented via substitution operations that are guided by argument structures in accordance with one or more embodiments described herein.

First, consider FIG. 12. The AMR graph 702, the natural language sentence 704, the domain-specific graph 706, the domain-specific token 708, the new AMR graph 710, and the new natural language sentence 712 can be as described above. However, in various aspects, rather than generating the new AMR graph 710 by utilizing a semantic-type-based determination, the augmentation component 118 can instead generate the new AMR graph 710 by utilizing an argument-structure-based determination.

As a non-limiting example, the augmentation component 118 can determine whether or not the root node 706(1) has a same or matching argument structure (e.g., has a same number, types, or arrangement of outgoing semantic relations) as any of the one or more non-leaf nodes 702(2). In response to determining that the root node 706(1) does have a same or matching argument structure as some particular non-leaf node of the one or more leaf nodes 702(2), the augmentation component 118 can substitute that particular non-leaf node, and all of the descendant nodes that are nested beneath that particular non-leaf node, with the domain-specific graph 706. In such case, the new AMR graph 710 can be the result of such substitution. Note that this can be considered as a non-limiting example of the one or more semantics-guided substitution operations 504.

Just as above, the augmentation component 118 can electronically generate the new natural language sentence 712, based on the natural language sentence 704 and based on the domain-specific token 708. In particular, the nodes of the AMR graph 702 can be aligned to the words of the natural language sentence 704. Accordingly, in various instances, the augmentation component 118 can identify whichever span of words of the natural language sentence 704 corresponds to (e.g., is aligned with) the nodes of the AMR graph 702 that were substituted. In various cases, the augmentation component 118 can replace that identified span of words with the domain-specific token 708, thereby yielding the new natural language sentence 712.

As FIG. 12 shows, the augmentation component 118 can generate various of the set of new AMR graphs 604 and various of the set of new natural language sentences 602, via graph substitutions that are performed in response to argument-structure-based determinations.

For non-limiting illustrative clarity, consider FIG. 13. FIG. 13 depicts a new AMR graph 1302 (e.g., one of 604) that can be generated from the AMR graph 802 and from the domain-specific graph 804. Indeed, in various aspects, the augmentation component 118 can determine whether the root node 836 has a same argument structure as the non-leaf node 810. In various instances, argument structure can be considered as arrangement of outgoing semantic relations (e.g., as arrangement of outgoing edges). As shown, the outgoing edges of the root node 836 can be the semantic relation 838 and the semantic relation 842. Similarly, the outgoing edges of the non-leaf node 810 can be the semantic relation 812 and the semantic relation 816. If the semantic relations 838 and 842 respectively match the semantic relations 812 and 816, then it can be concluded that the root node 836 has a same argument structure as the non-leaf node 810. In response to determining that the root node 836 does have a same argument structure as the non-leaf node 810, the augmentation component 118 can substitute the non-leaf node 810 and all of its descendant nodes (e.g., the leaf nodes 814 and 818) with the domain-specific graph 804. Such substitution, which can be considered as a non-limiting example of a semantics-guided graph substitution operation, can yield the new AMR graph 1302. Note that such substitution can be performed, notwithstanding that the root node 836 might be of a different semantic type than the non-leaf node 810. In any case, although not explicitly shown in FIG. 13, the augmentation component 118 can generate a new natural language sentence (e.g., one of 602) for the new AMR graph 1302, based on the natural language sentence that is represented by the AMR graph 802 and based on the domain-specific token that is represented by the domain-specific graph 804. Indeed, as above, the augmentation component 118 can identify whatever span of words in the natural language sentence that is represented by the AMR graph 802 is aligned with the non-leaf node 810 and with its descendant nodes (e.g., with the leaf nodes 814 and 818), and the augmentation component 118 can replace that identified span of words with the domain-specific token represented by the domain-specific graph 804.

Note that the term "root node 836" is maintained in FIG. 13 for sake of naming consistency, notwithstanding that the root node 836 is not a top-most node of the new AMR graph 1302.

FIG. 14 illustrates an example, non-limiting algorithm 1400 that can facilitate augmentation of a training dataset via substitution operations that are guided by argument structures in accordance with one or more embodiments described herein.

In various embodiments, as shown, the algorithm 1400 can include the actions denoted by numerals 1102, 1104, 1106, 1108, 1118, 1122, 1124, and 1126, as described above. As also shown, the algorithm 1400 can omit the actions denoted by numerals 1110, 1112, 1114, and 1116. Furthermore, as shown, the algorithm 1400 can include a numeral 1402 in place of the numeral 1120. In various aspects, as shown by numeral 1402, the algorithm 1400 can include a condition of an if-loop, which can ask whether the argument structure of the root node of $sg_j$ is the same as the argument structure of the currently-considered non-leaf node of $g_i$. If it is the case that the argument structure of the root node of $sg_j$ is the same as the argument structure of the currently-considered non-leaf node of $g_i$ (e.g., even though the root node of $sg_j$ might be of a different semantic type than the currently-considered non-leaf node of $g_i$), then the algorithm 1400 can perform the actions shown by numerals 1122 and 1124 (e.g., can substitute $sg_j$ into $g_i$ to create a new AMR graph, and can leverage node-to-token alignments to generate a new sentence for that new AMR graph).

Figure 15:
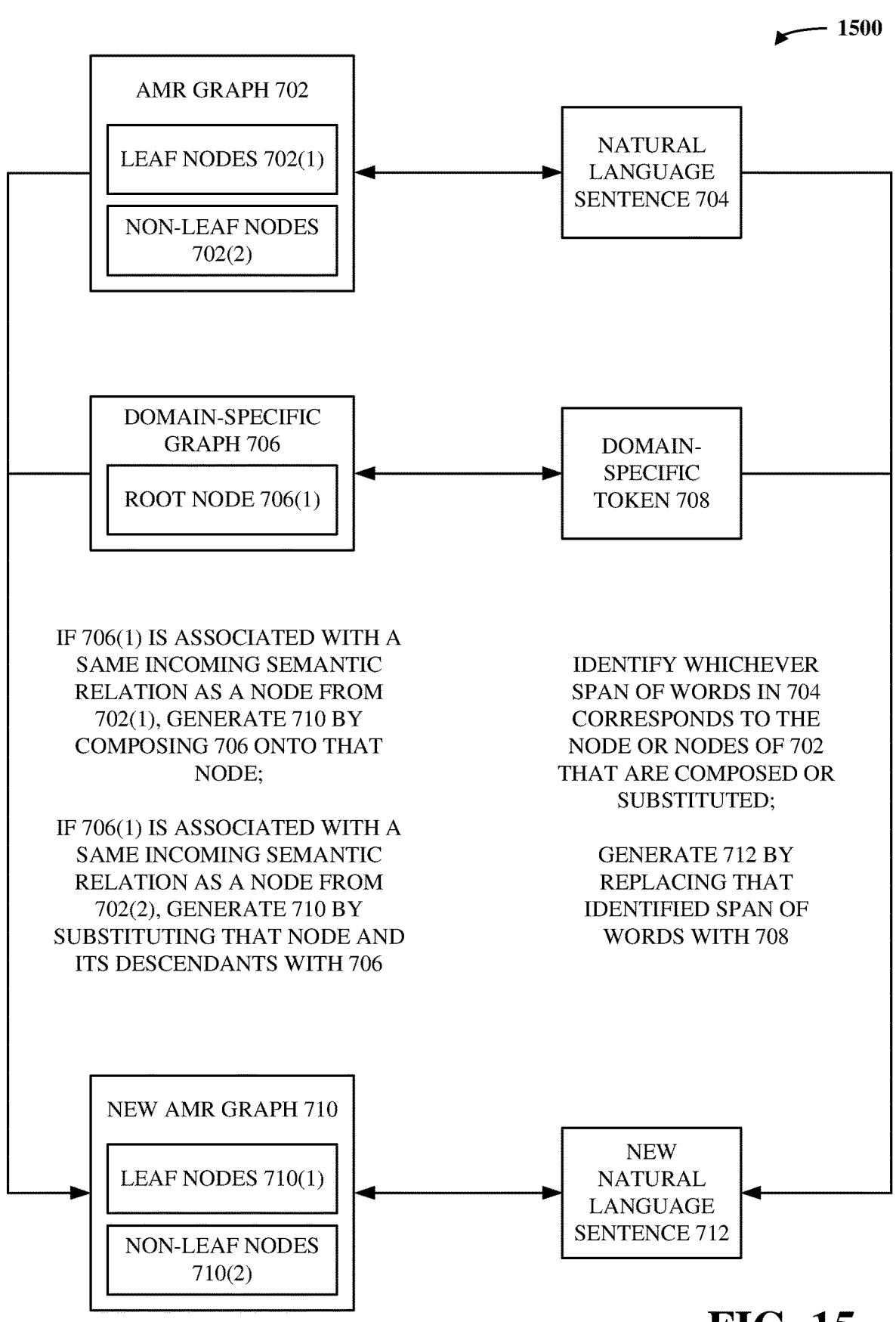

FIGS. 15-17 illustrate example, non-limiting block diagrams 1500, 1600, and 1700 showing how a training dataset can be augmented via composition and substitution operations that are guided by incoming semantic relations in accordance with one or more embodiments described herein.

First, consider FIG. 15. The AMR graph 702, the natural language sentence 704, the domain-specific graph 706, the domain-specific token 708, the new AMR graph 710, and the new natural language sentence 712 can be as described above. However, in various aspects, rather than generating the new AMR graph 710 by utilizing a semantic-type-based determination or an argument-structure-based determination, the augmentation component 118 can instead generate the new AMR graph 710 by utilizing an incoming-semantic-relation-based determination.

Note that as mentioned above, a root node of a directed acyclic graph can be a node toward which no edges point. Accordingly, the root node 706(1) can have no actual semantic relations that point to it in the domain-specific graph 706. However, the root node 706(1) can nevertheless be associated with one or more incoming semantic relations. After all, the domain-specific graph 706 can, in some cases as mentioned above, have been extracted from any of the set of AMR graphs 204. Thus, prior to such extraction, the root node 706(1) of the domain-specific graph 706 can have formerly been a leaf node or a non-leaf node having one or more incoming semantic relations pointing or leading toward it. Moreover, even in situations where the domain-specific graph 706 was not extracted from the set of AMR graphs 204 and was instead manually crated from scratch, the root node 706(1) can nevertheless represent a concept that is known to commonly or frequently have one or more particular incoming semantic relations pointing or leading toward it. Accordingly, the root node 706(1) can be associated with one or more incoming semantic relations, notwithstanding being a top-most node of the domain-specific graph 706.

Thus, in various aspects, the augmentation component 118 can make any suitable determinations regarding the incoming semantic relations that are associated with the root node 706(1).

As a non-limiting example, the augmentation component 118 can determine whether or not an incoming semantic relation associated with the root node 706(1) is the same as an incoming semantic relation that leads or points to any of the one or more leaf nodes 702(1). In response to determining that an incoming semantic relation associated with the root node 706(1) is the same as an incoming semantic relation that leads or points to a particular leaf node of the one or more leaf nodes 702(1), the augmentation component 118 can compose the domain-specific graph 706 onto that particular leaf node, thereby yielding the new AMR graph 710. Note that this can be considered as a non-limiting example of the one or more semantics-guided composition operations 502.

As another non-limiting example, the augmentation component 118 can determine whether or not an incoming semantic relation associated with the root node 706(1) is the same as an incoming semantic relation that leads or points to any of the one or more non-leaf nodes 702(2). In response to determining that an incoming semantic relation associated with the root node 706(1) is the same as an incoming semantic relation that leads or points to a particular non-leaf node of the one or more non-leaf nodes 702(2), the augmentation component 118 can substitute that particular non-leaf node, and all of the descendant nodes that are nested beneath that particular non-leaf node, with the domain-specific graph 706, thereby yielding the new AMR graph 710. Note that this can be considered as a non-limiting example of the one or more semantics-guided substitution operations 504.

Just as above, the augmentation component 118 can electronically generate the new natural language sentence 712, based on the natural language sentence 704 and based on the domain-specific token 708. In particular, the nodes of the AMR graph 702 can be aligned to the words of the natural language sentence 704. Accordingly, in various instances, the augmentation component 118 can identify whichever span of words of the natural language sentence 704 corresponds to (e.g., is aligned with) the node or nodes of the AMR graph 702 that were composed or substituted. In various cases, the augmentation component 118 can replace that identified span of words with the domain-specific token 708, thereby yielding the new natural language sentence 712.

As FIG. 15 shows, the augmentation component 118 can generate various of the set of new AMR graphs 604 and various of the set of new natural language sentences 602, via graph compositions or substitutions that are performed in response to incoming-semantic-relation-based determinations.

For non-limiting illustrative clarity, consider FIGS. 16-17. FIG. 16 depicts a new AMR graph 1602 (e.g., one of 604) that can be generated from the AMR graph 802 and from the domain-specific graph 804. Indeed, in various aspects, when considering the semantic relation 816, the non-leaf node 810 can be considered as a parent node (e.g., the node away from which the semantic relation 816 points or leads), and the leaf node 818 can be considered as a child node (e.g., the node toward from which the semantic relation 816 points or leads). In various instances, the augmentation component 118 can determine whether any incoming semantic relation that is associated with the root node 836 is the same as the semantic relation 816. If any incoming semantic relation that is associated with the root node 836 is the same as the semantic relation 816, then the augmentation component 118 can compose the domain-specific graph 804 onto or with the leaf node 818. Accordingly, this can cause the non-leaf node 810 to now be a parent node of the root node 836; equivalently, the root node 836 can now be considered as a child node of the non-leaf node 810. Such composition, which can be considered as a non-limiting example of a semantics-guided graph composition operation, can yield the new AMR graph 1602. Note that such composition can be performed, notwithstanding that the root node 836 might be of a different semantic type than the leaf node 818 or might have a different argument structure than the leaf node 818 (e.g., indeed, the leaf node 818 has no argument structure, since it is a leaf node). In any case, although not explicitly shown in FIG. 16, the augmentation component 118 can generate a new natural language sentence (e.g., one of 602) for the new AMR graph 1602, based on the natural language sentence that is represented by the AMR graph 802 and based on the domain-specific token that is represented by the domain-specific graph 804. Indeed, as above, the augmentation component 118 can identify whatever span of words in the natural language sentence that is represented by the AMR graph 802 is aligned with the leaf node 818, and the augmentation component 118 can replace that identified span of words with the domain-specific token represented by the domain-specific graph 804.

Note that the term "root node 836" is maintained in FIG. 16 for sake of naming consistency, notwithstanding that the root node 836 is not a top-most node of the new AMR graph 1602.

Now, consider FIG. 17. FIG. 17 depicts a new AMR graph 1702 (e.g., one of 604) that can be generated from the AMR graph 802 and from the domain-specific graph 804. Indeed, in various aspects, when considering the semantic relation 828, the non-leaf node 826 can be considered as a parent node (e.g., the node away from which the semantic relation 828 points or leads), and the non-leaf node 830 can be considered as a child node (e.g., the node toward from which the semantic relation 828 points or leads). In various instances, the augmentation component 118 can determine whether any incoming semantic relation that is associated with the root node 836 is the same as the semantic relation 828. If any incoming semantic relation that is associated with the root node 836 is the same as the semantic relation 828, then the augmentation component 118 can substitute the non-leaf node 830 and its descendants (e.g., the leaf node 834) with the domain-specific graph 804. Accordingly, this can cause the non-leaf node 826 to now be a parent node of the root node 836; equivalently, the root node 836 can now be considered as a child node of the non-leaf node 826. Such substitution, which can be considered as a non-limiting example of a semantics-guided graph substitution operation, can yield the new AMR graph 1702. Note that such substitution can be performed, notwithstanding that the root node 836 might be of a different semantic type than the non-leaf node 830 or might have a different argument structure than the non-leaf node 830. In any case, although not explicitly shown in FIG. 16, the augmentation component 118 can generate a new natural language sentence (e.g., one of 602) for the new AMR graph 1702, based on the natural language sentence that is represented by the AMR graph 802 and based on the domain-specific token that is represented by the domain-specific graph 804. Indeed, as above, the augmentation component 118 can identify whatever span of words in the natural language sentence that is represented by the AMR graph 802 is aligned with the non-leaf node 830 and with its descendants (e.g., with the leaf node 834), and the augmentation component 118 can replace that identified span of words with the domain-specific token represented by the domain-specific graph 804.

Note that the term "root node 836" is maintained in FIG. 17 for sake of naming consistency, notwithstanding that the root node 836 is not a top-most node of the new AMR graph 1702.

Figure 18:
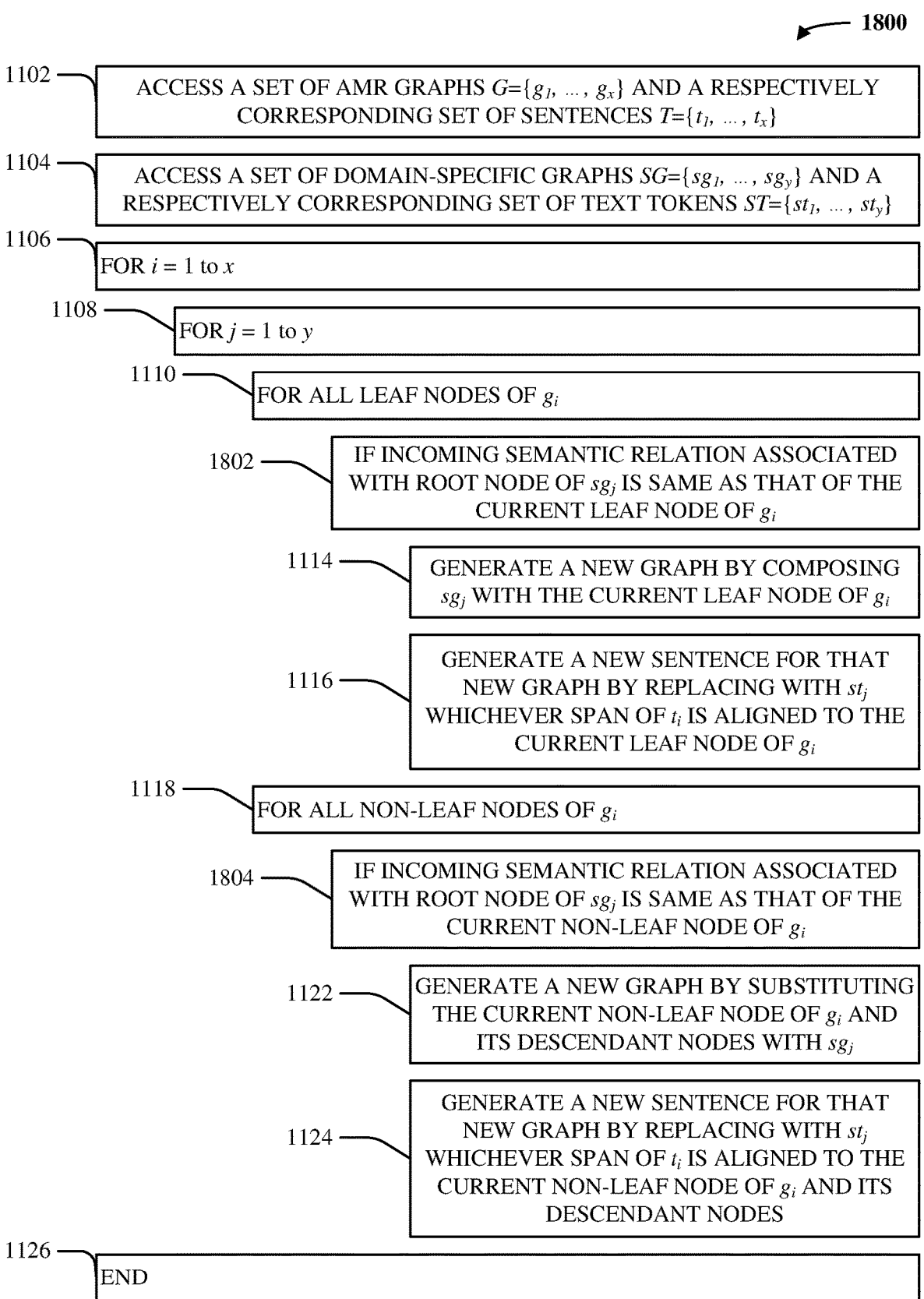
FIG. 18 illustrates an example, non-limiting algorithm that facilitates augmentation of a training dataset via composition and substitution operations that are guided by incoming semantic relations in accordance with one or more embodiments described herein.

FIG. 18 illustrates an example, non-limiting algorithm 1800 that can facilitate augmentation of a training dataset via composition and substitution operations that are guided by incoming semantic relations in accordance with one or more embodiments described herein.

In various embodiments, as shown, the algorithm 1800 can include actions denoted by numerals 1102, 1104, 1106, 1108, 1110, 1114, 1116, 1118, 1122, 1124, and 1126. Furthermore, as shown, the algorithm 1800 can include a numeral 1802 in place of the numeral 1112. In various aspects, as shown by numeral 1802, the algorithm 1800 can include a condition of an if-loop, which can ask whether an incoming semantic relation associated with the root node of $sg_j$ is the same as an incoming semantic relation that points or leads to the currently-considered leaf node of $g_i$. If it is the case that an incoming semantic relation associated with the root node of $sg_j$ is the same as an incoming semantic relation that points or leads to the currently-considered leaf node of $g_i$ (e.g., even though the root node of $sg_j$ might be of a different semantic type or might have a different argument structure than the currently-considered leaf node of $g_i$), then the algorithm 1800 can perform the actions shown by numerals 1114 and 1116 (e.g., can compose $sg_j$ onto $g_i$ to create a new AMR graph, and can leverage node-to-token alignments to generate a new sentence for that new AMR graph).

Further still, as shown, the algorithm 1800 can include a numeral 1804 in place of the numeral 1120. In various aspects, as shown by numeral 1804, the algorithm 1800 can include a condition of an if-loop, which can ask whether an incoming semantic relation associated with the root node of $sg_j$ is the same as an incoming semantic relation that points or leads to the currently-considered non-leaf node of $g_i$. If it is the case that an incoming semantic relation associated with the root node of $sg_j$ is the same as an incoming semantic relation that points or leads to the currently-considered non-leaf node of $g_i$ (e.g., even though the root node of $sg_j$ might be of a different semantic type or might have a different argument structure than the currently-considered non-leaf node of $g_i$), then the algorithm 1800 can perform the actions shown by numerals 1122 and 1124 (e.g., can substitute $sg_j$ into $g_i$ to create a new AMR graph, and can leverage node-to-token alignments to generate a new sentence for that new AMR graph).

In any case, and referring back to FIG. 5, the augmentation component 118 can electronically generate the augmented annotated training dataset 506, by applying the one or more semantics-guided composition operations 502 or the one or more semantics-guided substitution operations 504 to the annotated training dataset 106 and based on the domain lexicon legend 302. Note that, in various aspects, any other suitable augmentation techniques (e.g., MBSE distillation) can be implemented as desired, so as to supplement or complement the augmentation facilitated by the one or more semantics-guided composition operations 502 or by the one or more semantics-guided substitution operations 504.

In various embodiments, the training component 120 can electronically train the AMR parser 104 on the augmented annotated training dataset 506. In various aspects, such training can be performed in supervised fashion. A non-limiting example of such training can be facilitated as follows.

If the AMR parser 104 has not yet been trained at all, the training component 120 can, prior to beginning training, initialize the trainable internal parameters (e.g., weight matrices, bias vectors, convolutional kernels) of the AMR parser 104 in any suitable fashion (e.g., random initialization). However, if the AMR parser 104 has previously been trained (e.g., so as to perform AMR parsing on domains that are different from the domain 108), then the training component 120 can refrain from initializing the trainable internal parameters of the AMR parser 104.

In various aspects, the training component 120 can select from the augmented annotated training dataset 506 any suitable AMR graph (e.g., from 204, or from 604) and whichever natural language sentence (e.g., from 202, or from 602) corresponds to that selected AMR graph.

In various instances, the training component 120 can execute the AMR parser 104 on the selected natural language sentence. In various instances, this can cause the AMR parser 104 to produce some output. More specifically, the training component 120 can feed the selected natural language sentence to an input layer of the AMR parser 104. In various cases, the selected natural language sentence can complete a forward pass through one or more hidden layers of the AMR parser 104. Accordingly, an output layer of the AMR parser 104 can compute or calculate the output based on activation maps produced by the one or more hidden layers of the AMR parser 104.

Note that, in various cases, the format, size, or dimensionality of the output can be controlled or otherwise determined by the number, arrangement, or sizes of neurons or other internal parameters (e.g., convolutional kernels) that are contained in or that otherwise make up the output layer (or other layers) of the AMR parser 104. Thus, the output can be forced to have any desired format, size, or dimensionality by adding, removing, or otherwise adjusting neurons or other internal parameters to, from, or within the output layer (or other layers) of the AMR parser 104.

In any case, the output can be considered as being an inferred or predicted AMR graph for the selected natural language sentence. In contrast, the selected AMR graph can be considered the correct or accurate ground-truth for that selected natural language sentence. Note that, if the AMR parser 104 has so far undergone no or little training with respect to the domain 108, then the output can be highly inaccurate (e.g., the output can be very different from the selected AMR graph).

In various aspects, the training component 120 can compute an error or loss (e.g., mean absolute error, mean squared, cross-entropy) between the output and the selected AMR graph. In various instances, the training component 120 can incrementally update the trainable internal parameters of the AMR parser 104, by performing backpropagation (e.g., stochastic gradient descent) driven by the computed error or loss.

In various cases, the training component 120 can repeat the above-described training procedure for any suitable number of natural language sentences (e.g., for all sentences in the augmented annotated training dataset 506). This can ultimately cause the trainable internal parameters of the AMR parser 104 to become iteratively optimized for accurately generating AMR graphs based on inputted natural language sentences that use vocabulary of the domain 108. In various aspects, the training component 120 can implement any suitable training batch sizes, any suitable training termination criterion, or any suitable error, loss, or objective function when training the AMR parser 104.

Note that the above-described training is a mere non-limiting example of how the training component 120 can train the AMR parser 104 on the augmented annotated training dataset 506. In various aspects, the training component 120 can train the AMR parser 104 on the augmented annotated training dataset 506 in any other suitable fashion.

After having been trained, the AMR parser 104 can subsequently be deployed, so as to perform AMR parsing in the field. As a non-limiting example, the augmentation system 102 can: execute the AMR parser 104, post training, on any suitable natural language sentence that is generated by a user who desires to search a structured database associated with the domain 108, thereby yielding an AMR graph for that natural language sentence; subsequently process or convert (via any suitable knowledge base techniques) that AMR graph into a structured query that is executable over the structured database; and execute the structured query over that structured database.

To help demonstrate technical benefits of various embodiments described herein, the present inventors conducted various experiments. During such experiments, a first augmented annotated training dataset was generated via an existing technique (e.g., MBSE distillation). Also during such experiments, a second augmented annotated training dataset was generated via various embodiments described herein (e.g., applying semantics-guided domain-specific augmentation to an initial set of 200 natural language sentences and their corresponding AMR graphs). A first AMR parser was trained on the first augmented annotated training dataset, and a second AMR parser was trained on the second augmented annotated training dataset. Those two AMR parsers both had the same internal architecture (e.g., BART) and computational footprint.

During validation on a first testing dataset, the first AMR parser achieved an accuracy level of 75.2%, whereas the second AMR parser achieved an accuracy level of 95.5%. During validation on a second testing dataset, the first AMR parser achieved an accuracy level of 71.6%, whereas the second AMR parser achieved an accuracy level of 92.5%.

As these results show, the second AMR parser, which was trained on data that had been augmented according to various embodiments described herein, exhibited significantly better performance than the first AMR parser, which was trained on data that had been augmented according to an existing technique. In other words, various embodiments described herein caused the second AMR parser to achieve significantly improved performance than the first AMR parser. In still other words, various embodiments described herein can be considered as an improved data augmentation technique for text-to-graph parsing. In any case, the experiments conducted by the present inventors demonstrate that various embodiments described herein can cause tangible, concrete, real-world performance improvements in AMR parsers. For at least these reasons, various embodiments described herein certainly qualify as useful and practical applications of computers.

FIG. 19 illustrates a flow diagram of an example, non-limiting computer-implemented method 1900 that can facilitate semantics-guided domain-specific data augmentation for text-to-graph parsing in accordance with one or more embodiments described herein. In various cases, the augmentation system 102 can facilitate the computer-implemented method 1900.

In various embodiments, act 1902 can include accessing, by a device (e.g., via 114) operatively coupled to a processor (e.g., 110), an annotated training dataset (e.g., 106), wherein the annotated training dataset can comprise a set of abstract meaning representation graphs (e.g., 204) respectively corresponding to a set of natural language sentences (e.g., 202).

In various aspects, act 1904 can include generating, by the device (e.g., via 118), an augmented version (e.g., 506) of the annotated training dataset, based on applying semantics-guided composition operations (e.g., 502) or semantics-guided substitution operations (e.g., 504) to the set of abstract meaning representation graphs.

Although not explicitly shown in FIG. 19, the computer-implemented method 1900 can comprise: training, by the device (e.g., via 120), an abstract meaning representation parser (e.g., 104) on the augmented version of the annotated training dataset.

Although not explicitly shown in FIG. 19, the computer-implemented method 1900 can comprise: for a first abstract meaning representation graph (e.g., 802) from the annotated training dataset and for a domain-specific graph (e.g., 804) extracted from the annotated training dataset or derived from one or more domain-specific resources: generating, by the device (e.g., via 118) and in response to a determination that a root node (e.g., 836) of the domain-specific graph is of a same semantic type as a leaf node (e.g., 822) of the first abstract meaning representation graph, a second abstract meaning representation graph (e.g., 902) by composing the domain-specific graph onto the leaf node; and generating, by the device (e.g., via 118) and in response to a determination that the root node of the domain-specific graph is of the same semantic type as a non-leaf node (e.g., 826) of the first abstract meaning representation graph, a third abstract meaning representation graph (e.g., 1002) by substituting the non-leaf node and its descendant nodes (e.g., 830, 834) with the domain-specific graph.

Although not explicitly shown in FIG. 19, the computer-implemented method 1900 can comprise: for a first abstract meaning representation graph (e.g., 802) from the annotated training dataset and for a domain-specific graph (e.g., 804) extracted from the annotated training dataset or derived from one or more domain-specific resources: generating, by the device (e.g., via 118) and in response to a determination that a root node (e.g., 836) of the domain-specific graph has a same argument structure as a non-leaf node (e.g., 810) of the first abstract meaning representation graph, a second abstract meaning representation graph (e.g., 1302) by substituting the non-leaf node and its descendant nodes (e.g., 814, 818) with the domain-specific graph.

Although not explicitly shown in FIG. 19, the computer-implemented method 1900 can comprise: for a first abstract meaning representation graph (e.g., 802) from the annotated training dataset and for a domain-specific graph (e.g., 804) extracted from the annotated training dataset or derived from one or more domain-specific resources: generating, by the device (e.g., via 118) and in response to a determination that an incoming semantic relation associated with a root node (e.g., 836) of the domain-specific graph is the same as that between a parent node (e.g., 810) and a leaf child node (e.g., 818) of the first abstract meaning representation graph, a second abstract meaning representation graph (e.g., 1602) by composing the domain-specific graph onto the leaf child node; and generating, by the device (e.g., via 118) and in response to a determination that the incoming semantic relation associated with the root node of the domain-specific graph is the same as that between another parent node (e.g., 826) and a non-leaf child node (e.g., 830) of the first abstract meaning representation graph, a third abstract meaning representation graph (e.g., 1702) by substituting the non-leaf child node and its descendant nodes (e.g., 834) with the domain-specific graph.

Although not explicitly shown in FIG. 19, the generating the augmented version of the annotated training dataset can be further based on applying, commensurately with the semantics-guided composition operations or the semantics-guided substitution operations, node-to-token alignments to the set of natural language sentences (e.g., as described with respect to FIGS. 7-18).

Although not explicitly shown in FIG. 19, the annotated training dataset can pertain to a first domain (e.g., 108), and the annotated training dataset can be generated by applying automated term-replacements to another annotated training dataset pertaining to a second domain that is related to the first domain (e.g., that other dataset can have been previously curated or collected, and term-replacements blanketly applied to that other dataset can have yielded the annotated training dataset).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=$confidence (class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

FIG. 20 and the following discussion are intended to provide a brief, general description of a suitable computing environment 2000 in which one or more embodiments described herein can be implemented. For example, various aspects of the present disclosure are described by narrative text, flowcharts, block diagrams of computer systems or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks can be performed in reverse order, as a single integrated step, concurrently or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions or data for performing computer operations specified in a given CPP claim. A "storage device" is any tangible device that can retain and store instructions for use by a computer processor. Without limitation, the computer readable storage medium can be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 2000 contains an example of an environment for the execution of at least some of the computer code involved in performing the inventive methods, such as semantics-guided and domain-specific training data augmentation code 2080. In addition to block 2080, computing environment 2000 includes, for example, computer 2001, wide area network (WAN) 2002, end user device (EUD) 2003, remote server 2004, public cloud 2005, and private cloud 2006. In this embodiment, computer 2001 includes processor set 2010 (including processing circuitry 2020 and cache 2021), communication fabric 2011, volatile memory 2012, persistent storage 2013 (including operating system 2022 and block 2080, as identified above), peripheral device set 2014 (including user interface (UI), device set 2023, storage 2024, and Internet of Things (IoT) sensor set 2025), and network module 2015. Remote server 2004 includes remote database 2030. Public cloud 2005 includes gateway 2040, cloud orchestration module 2041, host physical machine set 2042, virtual machine set 2043, and container set 2044.

COMPUTER 2001 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 2030. As is well understood in the art of computer technology, and depending upon the technology, performance of a computer-implemented method can be distributed among multiple computers or between multiple locations. On the other hand, in this presentation of computing environment 2000, detailed discussion is focused on a single computer, specifically computer 2001, to keep the presentation as simple as possible. Computer 2001 can be located in a cloud, even though it is not shown in a cloud in FIG. 20. On the other hand, computer 2001 is not required to be in a cloud except to any extent as can be affirmatively indicated.

PROCESSOR SET 2010 includes one, or more, computer processors of any type now known or to be developed in the future. Processing circuitry 2020 can be distributed over multiple packages, for example, multiple, coordinated integrated circuit chips. Processing circuitry 2020 can implement multiple processor threads or multiple processor cores. Cache 2021 is memory that is located in the processor chip package(s) and is typically used for data or code that should be available for rapid access by the threads or cores running on processor set 2010. Cache memories are typically organized into multiple levels depending upon relative proximity to the processing circuitry. Alternatively, some, or all, of the cache for the processor set can be located "off chip." In some computing environments, processor set 2010 can be designed for working with qubits and performing quantum computing.

Computer readable program instructions are typically loaded onto computer 2001 to cause a series of operational steps to be performed by processor set 2010 of computer 2001 and thereby effect a computer-implemented method, such that the instructions thus executed will instantiate the methods specified in flowcharts or narrative descriptions of computer-implemented methods included in this document (collectively referred to as "the inventive methods"). These computer readable program instructions are stored in various types of computer readable storage media, such as cache 2021 and the other storage media discussed below. The program instructions, and associated data, are accessed by processor set 2010 to control and direct performance of the inventive methods. In computing environment 2000, at least some of the instructions for performing the inventive methods can be stored in block 2080 in persistent storage 2013.

COMMUNICATION FABRIC 2011 is the signal conduction path that allows the various components of computer 2001 to communicate with each other. Typically, this fabric is made of switches and electrically conductive paths, such as the switches and electrically conductive paths that make up busses, bridges, physical input/output ports and the like. Other types of signal communication paths can be used, such as fiber optic communication paths or wireless communication paths.

VOLATILE MEMORY 2012 is any type of volatile memory now known or to be developed in the future. Examples include dynamic type random access memory (RAM) or static type RAM. Typically, the volatile memory is characterized by random access, but this is not required unless affirmatively indicated. In computer 2001, the volatile memory 2012 is located in a single package and is internal to computer 2001, but, alternatively or additionally, the volatile memory can be distributed over multiple packages or located externally with respect to computer 2001.

PERSISTENT STORAGE 2013 is any form of non-volatile storage for computers that is now known or to be developed in the future. The non-volatility of this storage means that the stored data is maintained regardless of whether power is being supplied to computer 2001 or directly to persistent storage 2013. Persistent storage 2013 can be a read only memory (ROM), but typically at least a portion of the persistent storage allows writing of data, deletion of data and re-writing of data. Some familiar forms of persistent storage include magnetic disks and solid-state storage devices. Operating system 2022 can take several forms, such as various known proprietary operating systems or open-source Portable Operating System Interface type operating systems that employ a kernel. The code included in block 2080 typically includes at least some of the computer code involved in performing the inventive methods.

PERIPHERAL DEVICE SET 2014 includes the set of peripheral devices of computer 2001. Data communication connections between the peripheral devices and the other components of computer 2001 can be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 2023 can include components such as a display screen, speaker, microphone, wearable devices (such as goggles and smart watches), keyboard, mouse, printer, touchpad, game controllers, and haptic devices. Storage 2024 is external storage, such as an external hard drive, or insertable storage, such as an SD card. Storage 2024 can be persistent or volatile. In some embodiments, storage 2024 can take the form of a quantum computing storage device for storing data in the form of qubits. In embodiments where computer 2001 is required to have a large amount of storage (for example, where computer 2001 locally stores and manages a large database) then this storage can be provided by peripheral storage devices designed for storing large amounts of data, such as a storage area network (SAN) that is shared by multiple, geographically distributed computers. IoT sensor set 2025 is made up of sensors that can be used in Internet of Things applications. For example, one sensor can be a thermometer and another sensor can be a motion detector.

NETWORK MODULE 2015 is the collection of computer software, hardware, and firmware that allows computer 2001 to communicate with other computers through WAN 2002. Network module 2015 can include hardware, such as modems or Wi-Fi signal transceivers, software for packetizing or de-packetizing data for communication network transmission, or web browser software for communicating data over the internet. In some embodiments, network control functions and network forwarding functions of network module 2015 are performed on the same physical hardware device. In other embodiments (for example, embodiments that utilize software-defined networking (SDN)), the control functions and the forwarding functions of network module 2015 are performed on physically separate devices, such that the control functions manage several different network hardware devices. Computer readable program instructions for performing the inventive methods can typically be downloaded to computer 2001 from an external computer or external storage device through a network adapter card or network interface included in network module 2015.

WAN 2002 is any wide area network (for example, the internet) capable of communicating computer data over non-local distances by any technology for communicating computer data, now known or to be developed in the future. In some embodiments, the WAN can be replaced or supplemented by local area networks (LANs) designed to communicate data between devices located in a local area, such as a Wi-Fi network. The WAN or LANs typically include computer hardware such as copper transmission cables, optical transmission fibers, wireless transmission, routers, firewalls, switches, gateway computers and edge servers.

END USER DEVICE (EUD) 2003 is any computer system that is used and controlled by an end user (for example, a customer of an enterprise that operates computer

2001) and can take any of the forms discussed above in connection with computer 2001. EUD 2003 typically receives helpful and useful data from the operations of computer 2001. For example, in a hypothetical case where computer 2001 is designed to provide a recommendation to an end user, this recommendation would typically be communicated from network module 2015 of computer 2001 through WAN 2002 to EUD 2003. In this way, EUD 2003 can display, or otherwise present, the recommendation to an end user. In some embodiments, EUD 2003 can be a client device, such as thin client, heavy client, mainframe computer or desktop computer.

REMOTE SERVER 2004 is any computer system that serves at least some data or functionality to computer 2001. Remote server 2004 can be controlled and used by the same entity that operates computer 2001. Remote server 2004 represents the machine(s) that collect and store helpful and useful data for use by other computers, such as computer 2001. For example, in a hypothetical case where computer 2001 is designed and programmed to provide a recommendation based on historical data, then this historical data can be provided to computer 2001 from remote database 2030 of remote server 2004.

PUBLIC CLOUD 2005 is any computer system available for use by multiple entities that provides on-demand availability of computer system resources or other computer capabilities, especially data storage (cloud storage) and computing power, without direct active management by the scale. The direct and active management of the computing resources of public cloud 2005 is performed by the computer hardware or software of cloud orchestration module 2041. The computing resources provided by public cloud 2005 are typically implemented by virtual computing environments that run on various computers making up the computers of host physical machine set 2042, which is the universe of physical computers in or available to public cloud 2005. The virtual computing environments (VCEs) typically take the form of virtual machines from virtual machine set 2043 or containers from container set 2044. It is understood that these VCEs can be stored as images and can be transferred among and between the various physical machine hosts, either as images or after instantiation of the VCE. Cloud orchestration module 2041 manages the transfer and storage of images, deploys new instantiations of VCEs and manages active instantiations of VCE deployments. Gateway 2040 is the collection of computer software, hardware and firmware allowing public cloud 2005 to communicate through WAN 2002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 2006 is similar to public cloud 2005, except that the computing resources are only available for use by a single enterprise. While private cloud 2006 is depicted as being in communication with WAN 2002, in other embodiments a private cloud can be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, or data/application portability between the multiple constituent clouds. In this embodiment, public cloud 2005 and private cloud 2006 are both part of a larger hybrid cloud.

The embodiments described herein can be directed to one or more of a system, a method, an apparatus or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++ or the like, or procedural programming languages, such as the "C" programming language or similar programming languages. The computer readable program instructions can execute entirely on a computer, partly on a computer, as a stand-alone software package, partly on a computer or partly on a remote computer or entirely on the remote computer or server. In the latter scenario, the remote computer can be connected to a computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations or block diagrams of methods, apparatus (systems), and computer program products according to one or more embodiments described herein. It will be understood that each block of the flowchart illustrations or block diagrams, and combinations of blocks in the flowchart illustrations or block diagrams, can be implemented by computer readable program instructions. These computer readable program instructions can be provided to a processor of a general-purpose computer, special purpose computer or other programmable data processing apparatus to produce a machine, such that the instructions, which execute via the processor of the computer or other programmable data processing apparatus, can create means for implementing the functions/acts specified in the flowchart or block diagram block or blocks. These computer readable program instructions can also be stored in a computer readable storage medium that can direct a computer, a programmable data processing apparatus or other devices to function in a particular manner, such that the computer readable storage medium having instructions stored therein can comprise an article of manufacture including instructions which can implement aspects of the function/act specified in the flowchart or block diagram block or blocks. The computer readable program instructions can also be loaded onto a computer, other programmable data processing apparatus or other device to cause a series of operational acts to be performed on the computer, other programmable apparatus or other device to produce a computer implemented process, such that the instructions which execute on the computer, other programmable apparatus or other device implement the functions/acts specified in the flowchart or block diagram block or blocks.

The flowcharts and block diagrams in the figures illustrate the architecture, functionality or operation of possible implementations of systems, computer-implementable methods or computer program products according to one or more embodiments described herein. In this regard, each block in the flowchart or block diagrams can represent a module, segment or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams or flowchart illustration, or combinations of blocks in the block diagrams or flowchart illustration, can be implemented by special purpose hardware-based systems that can perform the specified functions or acts or carry out one or more combinations of special purpose hardware or computer instructions.

While the subject matter has been described above in the general context of computer-executable instructions of a computer program product that runs on a computer or computers, those skilled in the art will recognize that the one or more embodiments herein also can be implemented at least partially in parallel with one or more other program modules. Generally, program modules include routines, programs, components or data structures that perform particular tasks or implement particular abstract data types. Moreover, the aforedescribed computer-implemented methods can be practiced with other computer system configurations, including single-processor or multiprocessor computer systems, mini-computing devices, mainframe computers, as well as computers, hand-held computing devices (e.g., PDA, phone), or microprocessor-based or programmable consumer or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" or "interface" can refer to or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter described herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

The herein disclosure describes non-limiting examples of various embodiments. For ease of description or explanation, various portions of the herein disclosure utilize the term "each", "every", or "all" when discussing various embodiments. Such usages of the term "each", "every", or "all" are non-limiting examples. In other words, when the herein disclosure provides a description that is applied to "each", "every", or "all" of some particular object or component, it should be understood that this is a non-limiting example of various embodiments, and it should be further understood that, in various other embodiments, it can be the case that such description applies to fewer than "each", "every", or "all" of that particular object or component.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches or gates, in order to optimize space usage or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) or Rambus dynamic RAM (RDRAM). Also, the described memory components of systems or computer-implemented methods herein are intended to include, without being limited to including, these or any other suitable types of memory.

What has been described above includes mere examples of systems and computer-implemented methods. It is, of course, not possible to describe every conceivable combination of components or computer-implemented methods for purposes of describing the one or more embodiments, but one of ordinary skill in the art can recognize that many further combinations or permutations of the one or more embodiments are possible. Furthermore, to the extent that the terms "includes," "has," "possesses," and the like are used in the detailed description, claims, appendices or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising:
a memory configured to store computer-executable components; and
a processor that executes at least one of the computer-executable components that:
accesses an annotated training dataset that has been employed to train a deep learning model, wherein the annotated training dataset comprises a set of training abstract meaning representation (AMR) graphs respectively corresponding to a set of training natural language sentences;
generates, using the annotated training dataset and a domain lexicon legend for a domain, an augmented annotated training dataset, based on applying at least one of semantics-guided composition operations or semantics-guided substitution operations to the set of training AMR graphs to generate additional training AMR graphs and respective additional training natural language sentences associated with the additional training AMR graphs, wherein the domain lexicon legend comprises:
words associated with the domain, and
domain-specific graphs that represent the words; and retrains, using the augmented annotated training dataset, the deep learning model to generate AMR graphs for the domain based on natural language sentences.

2. The system of claim 1, wherein the generating the augmented annotated training dataset comprises, for a first training AMR graph from the annotated training dataset and for a domain-specific graph of the domain-specific graphs:
in response to a determination that a root node of the domain-specific graph is of a same semantic type as a leaf node of the first training AMR graph, generating a second training AMR graph by composing the domain-specific graph onto the leaf node; and
in response to a determination that the root node of the domain-specific graph is of the same semantic type as a non-leaf node of the first training AMR graph, generating a third training AMR graph by substituting the non-leaf node and its descendant nodes with the domain-specific graph.

3. The system of claim 1, wherein the generating the augmented annotated training dataset comprises, for a first training AMR graph from the annotated training dataset and for a domain-specific graph of the domain-specific graphs:
in response to a determination that a root node of the domain-specific graph has a same argument structure as a non-leaf node of the first training AMR graph, generating a second training AMR graph by substituting the non-leaf node and its descendant nodes with the domain-specific graph.

4. The system of claim 1, wherein the generating the augmented annotated training dataset comprises, for a first training AMR graph from the annotated training dataset and for a domain-specific graph of the domain-specific graphs:
in response to a determination that an incoming semantic relation associated with a root node of the domain-specific graph is the same as that between a parent node and a leaf child node of the first training AMR graph, generating a second training AMR graph by composing the domain-specific graph onto the leaf child node; and
in response to a determination that the incoming semantic relation associated with the root node of the domain-specific graph is the same as that between another parent node and a non-leaf child node of the first training AMR graph, generating a third training AMR graph by substituting the non-leaf child node and its descendant nodes with the domain-specific graph.

5. The system of claim 1, wherein generating the augmented annotated training dataset comprises applying, commensurately with the semantics-guided composition operations or the semantics-guided substitution operations, node-to-token alignments to the set of training natural language sentences.

6. The system of claim 1, wherein the domain-specific graphs respectively do not represent full sentences.

7. The system of claim 1, wherein the domain is a first domain, and wherein the annotated training dataset is generated by applying automated term-replacements to another annotated training dataset pertaining to a second domain that is related to the first domain.

8. A computer-implemented method, comprising:
accessing, by a system operatively coupled to a processor, an annotated training dataset that has been employed to train a deep learning model, wherein the annotated training dataset comprises a set of training abstract meaning representation (AMR) graphs respectively corresponding to a set of training natural language sentences;

generating, by the system, using the annotated training dataset and a domain lexicon legend for a domain, an augmented annotated training dataset, based on applying at least one of semantics-guided composition operations or semantics-guided substitution operations to the set of training AMR graphs to generate additional training AMR graphs and respective additional training natural language sentences associated with the additional training AMR graphs, wherein the domain lexicon legend comprises:

words associated with the domain, and domain-specific graphs that represent the words; and retraining, by the system, using the augmented annotated training dataset, the deep learning model to generate AMR graphs for the domain based on natural language sentences.

9. The computer-implemented method of claim 8, wherein the generating the augmented annotated training dataset comprises, for a first training AMR graph from the annotated training dataset and for a domain-specific graph of the domain-specific graphs:

generating, in response to a determination that a root node of the domain-specific graph is of a same semantic type as a leaf node of the first training AMR graph, a second training AMR graph by composing the domain-specific graph onto the leaf node; and generating, in response to a determination that the root node of the domain-specific graph is of the same semantic type as a non-leaf node of the first training AMR graph, a third training AMR graph by substituting the non-leaf node and its descendant nodes with the domain-specific graph.

10. The computer-implemented method of claim 8, wherein the generating the augmented annotated training dataset comprises, for a first training AMR graph from the annotated training dataset and for a domain-specific graph of the domain-specific graphs:

generating, in response to a determination that a root node of the domain-specific graph has a same argument structure as a non-leaf node of the first training AMR graph, a second training AMR graph by substituting the non-leaf node and its descendant nodes with the domain-specific graph.

11. The computer-implemented method of claim 8, wherein the generating the augmented annotated training dataset comprises, for a first training AMR graph from the annotated training dataset and for a domain-specific graph of the domain-specific graphs:

generating, in response to a determination that an incoming semantic relation associated with a root node of the domain-specific graph is the same as that between a parent node and a leaf child node of the first training AMR graph, a second training AMR graph by composing the domain-specific graph onto the leaf child node; and generating, in response to a determination that the incoming semantic relation associated with the root node of the domain-specific graph is the same as that between another parent node and a non-leaf child node of the first training AMR graph, a third training AMR graph by substituting the non-leaf child node and its descendant nodes with the domain-specific graph.

12. The computer-implemented method of claim 8, wherein the generating the augmented annotated training dataset comprises applying, commensurately with the semantics-guided composition operations or the semantics-guided substitution operations, node-to-token alignments to the set of training natural language sentences.

13. The computer-implemented method of claim 8, wherein the domain-specific graphs respectively do not represent full sentences.

14. The computer-implemented method of claim 8, wherein the domain is a first domain, and wherein the annotated training dataset is generated by applying automated term-replacements to another annotated training dataset pertaining to a second domain that is related to the first domain.

15. A computer program product for facilitating semantics-guided domain-specific data augmentation for text-to-graph parsing, the computer program product comprising a computer-readable memory having program instructions embodied therewith, the program instructions executable by a processor to cause the processor to:

access an annotated training dataset that has been employed to train a deep learning model, wherein the annotated training dataset comprises a set of training abstract meaning representation (AMR) graphs respectively corresponding to a set of training natural language sentences;

generate, using the annotated training dataset and a domain lexicon legend for a domain, an augmented annotated training dataset, based on applying at least one of semantics-guided composition operations or semantics-guided substitution operations to the set of training AMR graphs to generate additional training AMR graphs and respective additional training natural language sentences associated with the additional training AMR graphs, wherein the domain lexicon legend comprises:

words associated with the domain, and domain-specific graphs that represent the words; and retrain, using the augmented annotated training dataset, the deep learning model to generate AMR graphs for the domain based on natural language sentences.

16. The computer program product of claim 15, the generating the augmented annotated training dataset comprises, for a first training AMR from the annotated training dataset and for a domain-specific graph of the domain-specific graphs:

generating, in response to a determination that a root node of the domain-specific graph is of a same semantic type as a leaf node of the first training AMR graph, a second training AMR graph by composing the domain-specific graph onto the leaf node; and generating, in response to a determination that the root node of the domain-specific graph is of the same semantic type as a non-leaf node of the first training AMR graph, a third training AMR graph by substituting the non-leaf node and its descendant nodes with the domain-specific graph.

17. The computer program product of claim 15, the generating the augmented annotated training dataset comprises, for a first training AMR graph from the annotated training dataset and for a domain-specific graph of the domain-specific graphs:

generating, in response to a determination that a root node of the domain-specific graph has a same argument structure as a non-leaf node of the first training AMR graph, a second training AMR graph by substituting the non-leaf node and its descendant nodes with the domain-specific graph.

18. The computer program product of claim 15, the generating the augmented annotated training dataset comprises, for a first training AMR graph from the annotated training dataset and for a domain-specific graph of the domain-specific graphs:

generating, in response to a determination that an incoming semantic relation associated with a root node of the domain-specific graph is the same as that between a parent node and a leaf child node of the first training AMR graph, a second training AMR graph by composing the domain-specific graph onto the leaf child node; and generating, in response to a determination that the incoming semantic relation associated with the root node of the domain-specific graph is the same as that between another parent node and a non-leaf child node of the first training AMR graph, a third training AMR graph by substituting the non-leaf child node and its descendant nodes with the domain-specific graph.

19. The computer program product of claim 15, wherein generating the augmented annotated training dataset, further based on comprises applying, commensurately with the semantics-guided composition operations or the semantics-guided substitution operations, node-to-token alignments to the set of training natural language sentences.

20. The computer program product of claim 15, wherein the domain-specific graphs respectively do not represent full sentences.

\* \* \* \* \*